United States Patent
Oniki et al.

(10) Patent No.: US 9,823,426 B2
(45) Date of Patent: Nov. 21, 2017

(54) OPTICAL COMMUNICATION DEVICE, TRANSMISSION APPARATUS, RECEPTION APPARATUS, AND TRANSMISSION AND RECEPTION SYSTEM

(71) Applicant: Sony Corporation, Tokyo (JP)

(72) Inventors: Kazunao Oniki, Tokyo (JP); Hiizu Ootorii, Kanagawa (JP); Eiji Otani, Kanagawa (JP)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 14/519,678

(22) Filed: Oct. 21, 2014

(65) Prior Publication Data

US 2015/0139590 A1 May 21, 2015

(30) Foreign Application Priority Data

Nov. 21, 2013 (JP) .................................. 2013-240761

(51) Int. Cl.
G02B 6/36 (2006.01)
G02B 6/38 (2006.01)
G02B 6/42 (2006.01)

(52) U.S. Cl.
CPC ......... *G02B 6/3853* (2013.01); *G02B 6/4249* (2013.01); *G02B 6/4292* (2013.01)

(58) Field of Classification Search
USPC ................................................ 385/33, 53, 88
See application file for complete search history.

(56) References Cited

U.S. PATENT DOCUMENTS

| | | | | |
|---|---|---|---|---|
| 5,555,332 A | * | 9/1996 | Dean ...................... | G02B 6/382 385/53 |
| 2010/0067853 A1 | * | 3/2010 | Kuznia .................... | G02B 6/43 385/88 |
| 2015/0098680 A1 | * | 4/2015 | Leigh ...................... | G02B 6/428 385/88 |

FOREIGN PATENT DOCUMENTS

JP          2008-535037          8/2008

* cited by examiner

*Primary Examiner* — Eric Wong
(74) *Attorney, Agent, or Firm* — Michael Best & Friedrich LLP

(57) ABSTRACT

There is provided an optical communication device including a lens substrate configured to have a first face on which a plurality of lenses corresponding to a plurality of channels of optical communication are two-dimensionally formed, and a ferrule configured to be disposed facing a second face that is the opposite face of the first face of the lens substrate and to be provided with through holes into which optical fibers are inserted in positions corresponding to each of the plurality of lenses.

21 Claims, 15 Drawing Sheets

OPTICAL COMMUNICATION DEVICE, TRANSMISSION APPARATUS, RECEPTION APPARATUS, AND TRANSMISSION AND RECEPTION SYSTEM

CROSS REFERENCE TO RELATED APPLICATIONS

This application claims the benefit of Japanese Priority Patent Application JP 2013-240761 filed Nov. 21, 2013, the entire contents of which are incorporated herein by reference.

BACKGROUND

The present disclosure relates to an optical communication system, a transmission apparatus, a reception apparatus, and a transmission and reception system.

As information-oriented society has developed in recent years, the amounts of information (amounts of data and amounts signals) handled by information processing apparatuses such as personal computers (PCs), servers, and the like have explosively increased. According to such increases in data amounts, the need to transfer more data at higher speeds in data transmission and reception performed between apparatuses, devices, or chips has grown. Hence, as a data transfer technology that replaces data transfer technologies using electrical signals (electrical signal communication technology or electrical interconnect technology) of the related art, an optical communication technology (or an optical interconnect technology) in which electrical signals are modulated into light and data transmission and reception is performed using the light has been proposed.

In the optical communication technology, light propagates between apparatuses using light guide members, for example, optical fibers, or the like. Here, with regard to connection of optical fibers and an input and output module for optical communication, it is preferable that the center axis including the core portion of the optical fiber be connected to the optical axis of emitted light or incident light of the module so as to coincide therewith. In addition, with regard to connection between the optical fibers, it is preferable that the center axes of the optical fibers be connected to each other so as to coincide with each other. If an amount of deviation between the axes increases, an amount of light loss occurring on the connection face between the optical fiber and the module, or the connection face between the optical fibers (a connection loss) increases, and thus there is a possibility of lowering efficiency in optical communication.

Thus, as a structure of a connector that is used in connection of optical fibers which enables a connection loss to be further reduced, a connector whose tip is provided with lenses has been proposed. In connection between optical fibers using such a connector, lenses thereof are connected facing each other. In a connector on a transmission side, light that is guided through optical fibers is diffused by lenses and then emitted toward lenses of another connector that it faces. In the connector on a reception side, light is collected on an end face of optical fibers by the lenses, and then is incident on the optical fibers. Since light is collected on the end face of the optical fibers by the lenses provided at the tip of a connector with the lenses in this manner, it is possible to reduce a connection loss even when accuracy in alignment of the center axes of the optical fibers is relatively low. For example, JP 2008-535037A discloses a technology with respect to a connector in which a lens substrate on which a lens array is formed is connected to a tip of a housing (which corresponds to a so-called ferrule) in which V-shaped grooves are formed at the positions corresponding to each of lenses of the lens array, ends of optical fibers are inserted in the housing as the optical fibers are accommodated in the V-shaped grooves, and thereby accuracy in aligning the optical axes of the lenses and the center axes of the optical fibers is improved.

SUMMARY

Here, a circumstance in which a user environment of a connector is changed and a temperature change occurs in members constituting the connector is assumed. When a temperature change occurs, each of the members constituting the connector expands or contracts according to the linear expansion coefficient (linear expansivity) thereof intrinsic to each of the materials.

On the other hand, the connector disclosed in JP 2008-535037A described above has a structure in which the lens substrate and the housing are formed with separate members using different materials, and they are connected to each other using pins. Thus, when a temperature change occurs in the connector disclosed in JP 2008-535037A described above, an amount of positional deviation (which is also referred to hereinafter as an amount of axial deviation) between the optical axes of the lenses and the center axes of the optical fibers increases because the linear expansion coefficient of the material constituting the lens substrate is different from that of the material constituting the housing, and therefore there is a possibility of a serious connection loss occurring.

In addition, in order to deal with a greater amount of data in optical communication in recent years, data transfer using a larger number of channels has been demanded. When the number of channels increases, for example, the channels can be two-dimensionally arrayed on an emission face and an incident face of light. When the technology disclosed in JP 2008-535037A described above is applied to optical communication that uses more channels, lenses corresponding in number to the channels are provided two-dimensionally, for example, on a lens substrate as a lens array. When the lenses are two-dimensionally provided, a change of a relative position of the lenses caused by a temperature change results in a two-dimensional change combined with a thermal deformation amount of the lens substrate in both of the vertical and horizontal directions, and thus there is a possibility of an amount of axial deviation caused by the temperature change further expanding. As described above, in the technology disclosed in JP 2008-535037A described above, there is concern in optical communication that uses more channels that are likely to be two-dimensionally arranged, for example, that the amount of axial deviation is large due to a change in a use environment, and that a serious connection loss may result therefrom.

In consideration of the above circumstances, a technology for further reducing a connection loss in the optical communication that uses many channels by controlling alignment of optical axes of lenses and center axes of optical fibers with high accuracy has been demanded. Therefore, the present disclosure proposes a novel and improved optical communication device, a transmission apparatus, a reception apparatus, and a transmission and reception system which enable further reduction of a connection loss.

According to an embodiment of the present disclosure, there is provided an optical communication device including a lens substrate configured to have a first face on which a plurality of lenses corresponding to a plurality of channels of optical communication are two-dimensionally formed, and a ferrule configured to be disposed facing a second face that is the opposite face of the first face of the lens substrate and to be provided with through holes into which optical fibers are inserted in positions corresponding to each of the plurality of lenses. A region of the lens substrate or the ferrule having a predetermined length at least in the direction perpendicular to a facing surface is divided into a plurality of regions in a row direction or a column direction within a plane that is parallel to the facing surface. When both ends of each of the plurality of regions are fixed to the facing surface by a pin, the lens substrate and the ferrule are connected to each other.

According to another embodiment of the present disclosure, there is a transmission apparatus including an optical communication device configured to include a lens substrate that has a first face on which a plurality of lenses corresponding to a plurality of channels of optical communication are two-dimensionally formed and a ferrule configured to be disposed facing a second face that is the opposite face of the first face of the lens substrate and to be provided with through holes into which optical fibers are inserted in positions corresponding to each of the plurality of lenses. In the optical communication device, a region of the lens substrate or the ferrule having a predetermined length at least in the direction perpendicular to a facing surface is divided into a plurality of regions in a row direction or a column direction within a plane that is parallel to the facing surface, and when at least both end portions of each of the plurality of regions are fixed to the facing surface by a pin, the lens substrate and the ferrule are connected to each other. Light on which predetermined information is superimposed is transmitted to an arbitrary apparatus via the optical communication device.

According to still another embodiment of the present disclosure, there is provided a reception apparatus including an optical communication device configured to include a lens substrate that has a first face on which a plurality of lenses corresponding to a plurality of channels of optical communication are two-dimensionally formed and a ferrule configured to be disposed facing a second face that is the opposite face of the first face of the lens substrate and to be provided with through holes into which optical fibers are inserted in positions corresponding to each of the plurality of lenses. In the optical communication device, a region of the lens substrate or the ferrule having a predetermined length at least in the direction perpendicular to a facing surface is divided into a plurality of regions in a row direction or a column direction within a plane that is parallel to the facing surface, and when at least both end portions of each of the plurality of regions are fixed to the facing surface by a pin, the lens substrate and the ferrule are connected to each other. Light on which predetermined information is superimposed is received from an arbitrary apparatus via the optical communication device.

According to yet another embodiment of the present disclosure, there is provided a transmission and reception system including a transmission apparatus configured to include an optical communication device which has a lens substrate that has a first face on which a plurality of lenses corresponding to a plurality of channels of optical communication are two-dimensionally formed and a ferrule that is disposed facing a second face that is the opposite face of the first face of the lens substrate and to be provided with through holes into which optical fibers are inserted in positions corresponding to each of the plurality of lenses, and configured to transmit light on which predetermined information is superimposed to an arbitrary apparatus via the optical communication device, and a reception apparatus configured to include such an optical communication device and to receive the light transmitted from the transmission apparatus via the optical communication device. In the optical communication device, a region of the lens substrate or the ferrule having a predetermined length at least in the direction perpendicular to a facing surface is divided into a plurality of regions in a row direction or a column direction within a plane that is parallel to the facing surface, and when at least both end portions of each of the plurality of regions are fixed to the facing surface by a pin, the lens substrate and the ferrule are connected to each other.

According to the present disclosure, the region of the lens substrate or the ferrule having the predetermined length at least in the direction perpendicular to the facing surface is divided into the plurality of regions in the row direction or the column direction within the plane parallel to the facing surface. In addition, when both ends of each of the plurality of divided regions are fixed to the facing surface by a pin, the lens substrate and the ferrule are connected to each other. Thus, amounts of deformation of the divided regions of the lens substrate and the ferrule caused by a temperature change correspond to each other. Therefore, an amount of positional deviation between optical axes of the lenses formed on the lens substrate and center axes of through holes provided in the ferrule caused by the temperature change can be reduced.

According to the present disclosure described above, it is possible to further reduce a connection loss. Note that the effects described above are not necessarily limiting, and along with or instead of the effects, any effect that is desired to be introduced in the present specification or other effects that can be expected from the present specification may be exhibited.

DETAILED DESCRIPTION OF THE EMBODIMENTS

Figure 1:
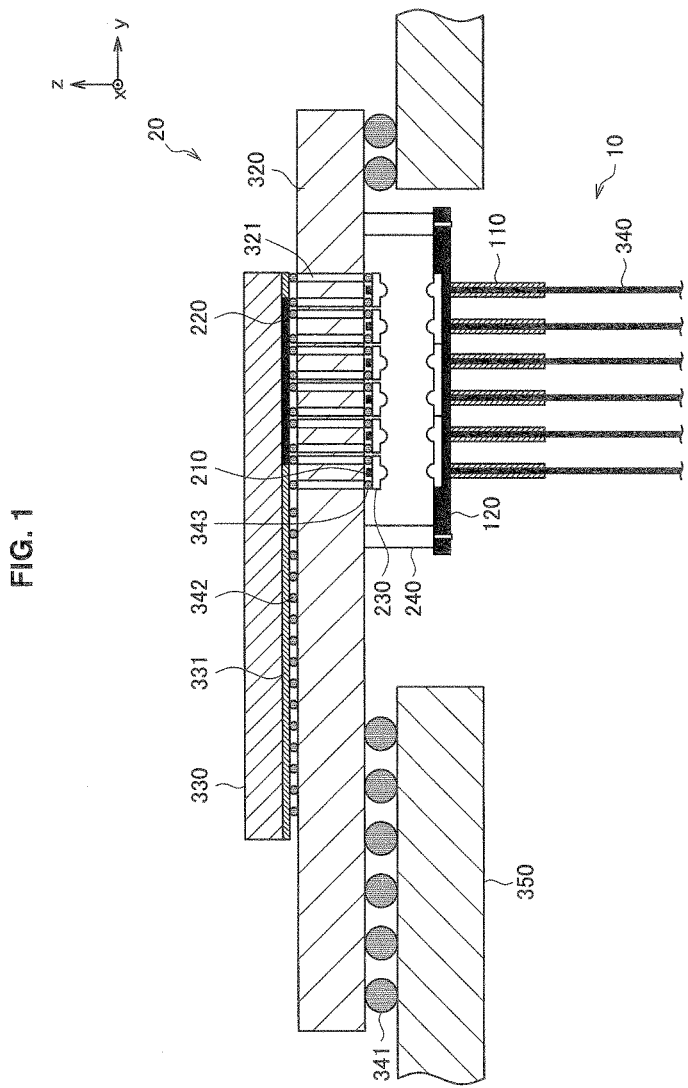
FIG. 1 is a cross-sectional diagram showing a schematic configuration of an optical communication device according to an embodiment that is connected to an optical communication module.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Embodiment of the present disclosure
1-1. Configuration of an optical communication device and an optical communication module
1-2. Configuration of the optical communication device
2. Comparison to a general connector
3. Modified examples
3-1. Modified example in which supporting members for suppressing deformation of ferrule members are added
3-2. Modified example in which parts of the ferrule members are connected to each other
3-3. Modified example in which a lens substrate is divided into a plurality of members
3-4. Modified example in which a lens substrate is composed of a plurality of materials
3-5. Modified example in which a ferrule and a lens substrate are formed of the same material
4. Application examples
4-1. Optical communication between optical communication modules and between apparatuses
4-2. Connection between optical fibers
5. Supplement 1. Embodiment of the Present Disclosure An optical communication device according to an embodiment of the present disclosure functions as a connector for, for example, connection between optical fibers through which light propagates in optical communication and an input and output module for optical communication (which will also be referred to hereinafter as an optical communication module) and connection between optical fibers. Hereinafter, as an embodiment of the present disclosure, a case in which optical fibers and an optical communication module are connected to each other by the optical communication device according to the present embodiment will be exemplified. The present embodiment, however, is not limited thereto, and the optical communication device according to the present embodiment may be applied to connection between devices in which optical communication modules are mounted, or may be applied to connection between optical fibers as described above.

Figure 2:
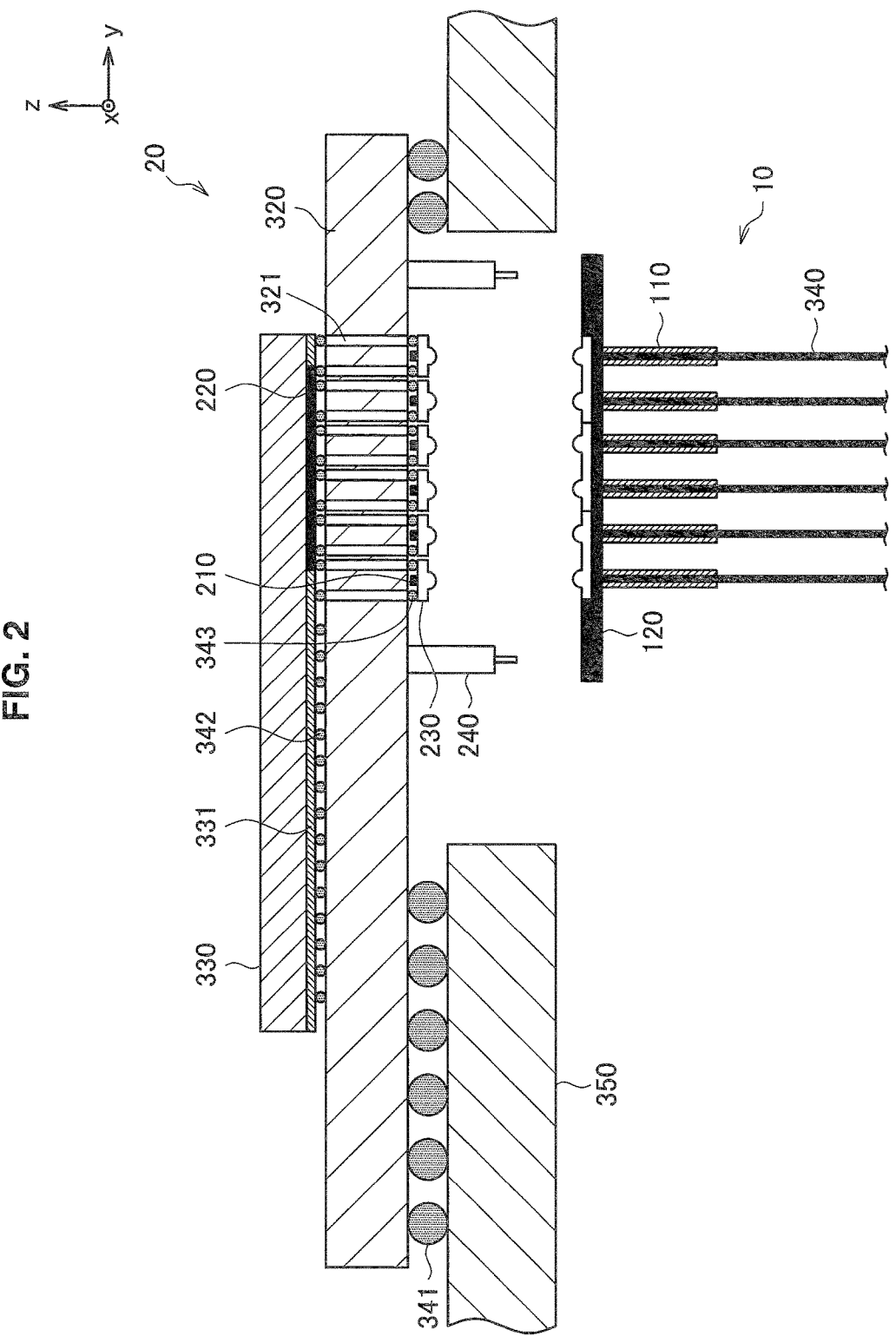
FIG. 2 is a schematic diagram showing a state in which the optical communication device according to the embodiment is detached from the optical communication module in the configuration shown in FIG. 1.

1-1. Configuration of an Optical Communication Device and an Optical Communication Module First, an overall configuration when the optical communication device according to the present embodiment is connected to an optical communication module will be described with reference to FIGS. 1 and 2. FIG. 1 is a cross-sectional diagram showing a schematic configuration of the optical communication device according to an embodiment that is connected to the optical communication module. FIG. 2 is a schematic diagram showing a state in which the optical communication device according to the embodiment is detached from the optical communication module in the configuration shown in FIG. 1.

Here, the optical communication module according to the present embodiment is a communication interface for transferring data between processors using light by performing photoelectric conversion of electrical signals and light. Specifically, the optical communication module has a data transmission function of converting electrical signals which have undergone a predetermined process by a processor and thereby have predetermined information superimposed thereon into light and transmitting the light to another optical communication module. In addition, the optical communication module has a data reception function of receiving light on which predetermined information is superimposed from another optical communication module, converting the received light into electrical signals, and then providing the electrical signals to a processor. One optical communication module may be configured to have both the data transmission function and the reception function, or to have any of the transmission function and the reception function.

An optical communication module with the transmission function (which may also be referred to hereinafter as a transmission side optical communication module) has a light emitting element and a drive circuit of the light emitting element, and appropriately drives the light emitting element using the drive circuit, and can thereby convert electrical signals on which predetermined information is superimposed into light and transmit the predetermined information as light. An optical communication module with the reception function (which may also be referred to hereinafter as a reception side optical communication module) has a light receiving element and a drive circuit of the light receiving element, and as light received by the light receiving element is read by the drive circuit as electrical signals on which predetermined information is superimposed, the predetermined information can be received as light. Note that, in description below, either of the light emitting element and the light receiving element may be referred to as an optical device.

FIGS. 1 and 2 illustrate a transmission side optical communication module as an example of the optical communication module. In the present embodiment, although different kinds of optical devices (in other words, a light receiving element or a light emitting element) are provided in the reception side optical communication module and the transmission side optical communication module and the optical devices are driven by different configurations of drive circuits, other configurations are the same. Thus, herein, based on the configuration of the transmission side optical communication module shown in FIGS. 1 and 2, the configurations of both optical communication modules of the transmission side and the reception side will be described.

Referring to FIGS. 1 and 2, a printed substrate 350, an interposer substrate 320, and a signal processing substrate 330, in a surface of which a processor 331 is formed, are stacked in this order. Here, in description below, the direction in which the printed substrate 350, the interposer substrate 320, and the signal processing substrate 330 are stacked is defined as a z-axis direction in the drawing. In addition, with respect to the z-axis direction, the direction in which the printed substrate 350, the interposer substrate 320, and the signal processing substrate 330 are stacked in this order is defined as the positive direction of the z axis, and the positive direction and the negative direction of the z axis are also referred to as an upward direction and downward direction respectively for the sake of convenience. Furthermore, two directions orthogonal to each other within a plane that is perpendicular to the z-axis direction are defined as an x-axis direction and a y-axis direction.

The printed substrate 350 and the interposer substrate 320 are electrically connected to each other by, for example, solder bumps 341 via a pad on the printed substrate 350 and a pad on the interposer substrate 320. The interposer substrate 320 and the signal processing substrate 330 are electrically connected to each other by, for example, solder bumps 342 via a pad on the interposer substrate 320 and a pad on the signal processing substrate 330. The signal processing substrate 330 is stacked on the interposer substrate 320 in a state in which a face on which a processor 331 is formed faces the interposer substrate 320, and the processor 331 and the interposer substrate 320 are electrically connected to each other via the solder bumps 342.

The processor 331 is an example of a signal processing circuit that performs a predetermined process on electrical signals. The processor 331 has an input and output interface (I/O unit), and is electrically connected to the interposer substrate 320 by the solder bumps 342 via a pad provided in the I/O unit. The processor 331 can be various kinds of arithmetic operation devices, for example, a central processing unit (CPU), a digital signal processor (DSP), and the like. The present embodiment, however, is not limited thereto, and various kinds of integrated circuits that perform predetermined signal processing, for example, a large scale integrated (LSI) circuit, an application specific integrated circuit (ASIC), and the like may also be connected to the optical communication module 20 as a signal processing circuit.

An opening is provided in a partial region of the printed substrate 350. The optical communication module 20 is configured by providing light emitting elements 210 which are optical devices in the position on the bottom face of the interposer substrate 320 which corresponds to the opening.

The light emitting elements 210 are provided, for example, to be at least corresponding in number to optical communication channels.

To be specific, the optical communication module 20 has the plurality of light emitting elements 210 provided on the first face (for example, the bottom face) side of the interposer substrate 320 and a drive circuit 220 provided on a second face (for example, the top face) of the interposer substrate 320 that is the face on the opposite side of the first face. In addition, the light emitting elements 210 and the drive circuit 220 are electrically connected to each other via through-vias 321 provided to penetrate the interposer substrate 320.

As shown in FIGS. 1 and 2, the drive circuit 220 is formed on the signal processing substrate 330 along with the processor 331. For example, the drive circuit 220 is formed in a region on the signal processing substrate 330 which corresponds to the position in which the light emitting elements 210 are arranged on the interposer substrate 320. Thus, when the interposer substrate 320 is electrically connected to the signal processing substrate 330 by the solder bumps 342, the drive circuit 220 and the light emitting elements 210 are electrically connected to each other via the through-vias 321 provided to penetrate the interposer substrate 320.

The light emitting elements 210 are optical elements which emit light having an intensity corresponding to an applied current value. The light emitting elements 210 can be, for example, a semiconductor layer, or more specifically, a vertical cavity surface emitting laser (VCSEL). The light emitting elements 210 are two-dimensionally arranged to be corresponding in number to the channels used in optical communication on the bottom face side of the interposer substrate 320. Note that light receiving elements are provided in the reception side optical communication module instead of the light emitting elements 210. The light receiving elements are optical elements that generate signal values according to received light, and can be, for example, photodiodes (PDs). The light emitting elements 210 and the light receiving elements used in the present embodiment, however, are not limited thereto, and various kinds of light emitting elements and light receiving elements used in general optical communication may be applied.

The drive circuit 220 is a circuit for driving the light emitting elements 210. Specifically, the drive circuit 220 may include, for example, a laser diode driver (LDD) for driving laser diodes which are the light emitting elements 210. Note that, in the reception side optical communication module, another drive circuit for driving the light receiving elements is provided instead of the drive circuit 220. The drive circuit for driving the light receiving elements may include, for example, a trans-impedance amplifier (TIA) for amplifying signal values generated by the light receiving elements. Note that, in the present embodiment, the configurations of the drive circuits for driving the light emitting elements 210 and the light receiving elements of the optical communication modules may be arbitrary, or may be appropriately designed according to the configurations of the light emitting elements 210 and the light receiving elements. Since, for example, configurations of various kinds of drive circuits generally used in optical communication can be applied to the configurations of the drive circuits for driving the light emitting elements 210 and the light receiving elements, detailed description thereof will be omitted.

Above the first face of the interposer substrate 320, a lens substrate 230 on which a plurality of lenses are formed two-dimensionally is provided so as to cover the plurality of light emitting elements 210. The plurality of lenses on the lens substrate 230 are formed in positions corresponding to the arrangement positions of each of the plurality of light emitting elements 210, and light emitted from the light emitting elements 210 is output to the outside through the lenses. As such, the lens substrate 230 forms a light input and output face of the optical communication module 20, and is disposed so as to be parallel to the plane defined by the x and y axes (x-y plane) as shown in FIGS. 1 and 2. The lenses formed on the lens substrate 230 are provided to be equal in number to, for example, the channels used in the optical communication. The light emitting elements 210 are arranged on the lens substrate 230 so as to be electrically connected to the lens substrate 230 by, for example, solder bumps 343. In addition, the lens substrate 230 is electrically connected to the drive circuit 220 by the solder bumps 343 via the through-vias 321. As such, the light emitting elements 210 are electrically connected to the drive circuit 220 via the lens substrate 230, the solder bumps 343, and the through-vias 321.

The optical communication device 10 according to the present embodiment is connected in the position in which the optical communication device faces the lens substrate 230 of the optical communication module 20. The optical communication device 10 includes a lens substrate 120 whose first face has a plurality of lenses formed two-dimensionally thereon and a ferrule 110 in which through holes which are disposed facing a second face that is the face on the opposite side of the first face of the lens substrate 120 and into which optical fibers 340 are inserted at the positions corresponding to each of the plurality of lenses are provided. In addition, faces of the lens substrate 120 and the ferrule 110 which face each other may come in contact with each other. As such, the optical communication device 10 according to the present embodiment has a so-called mechanical transfer (MT) ferrule with a lens array of which a tip is connected to the lens substrate 120 on which a lens array is formed. Note that, with respect to the ferrule 110 and the lens substrate 120 of the optical communication device 10 in description below, the faces of the ferrule 110 and the lens substrate 120 facing each other will also be referred to as facing surfaces.

The lenses formed on the lens substrate 120 and the through holes formed in the ferrule 110 are provided to be equal in number to, for example, the channels used in the optical communication. The through holes provided in the ferrule 110 are provided to penetrate the ferrule 110 in parallel to the z-axis direction, and by inserting the plurality of optical fibers 340 provided according to the number of channels into the through holes of the ferrule 110 from the negative direction of the z axis, each end of the optical fibers faces the plurality of lenses provided on the lens substrate 120.

The lenses formed on the lens substrate 120 of the optical communication device 10 are connected to the lenses formed on the lens substrate 230 of the optical communication module 20 so as to face each other. To be specific, fitting parts which are concave portions into which positioning pins 240 are fitted are provided in partial regions of the lens substrate 120 of the optical communication device 10. One end of the positioning pin 240 is fixedly connected to the bottom face of the interposer substrate 320. As shown in FIGS. 1 and 2, when the other end of the positioning pin 240 is attached to or detached from the fitting part of the lens substrate 120 of the optical communication device 10, the optical communication device 10 is attached to or detached from the optical communication module 20.

When light on which predetermined information is superimposed is discharged from each of the light emitting elements 210 of the optical communication module 20 and diffused by each of the lenses on the lens substrate 230, the light is incident on each of the facing lenses on the lens substrate 120 of the optical communication device 10. The light incident on each of the lenses on the lens substrate 120 is connected at each end of the optical fibers 340, and then incident on the inside of each of the optical fibers 340. As such, in the present embodiment, since light is exchanged between the optical communication module 20 and the optical communication device 10 through each of the lenses on the lens substrate 230 and each of the lenses on the lens substrate 120, even when accuracy in aligning the center axis of the light emitting elements 210 with that of the optical fibers 340 is relatively low, a connection loss can be reduced. Accordingly, multi-channel optical communication is realized in the present embodiment.

Hereinabove, the overall configuration in which the optical communication device 10 is connected to the optical communication module 20 according to the present embodiment has been described with reference to FIGS. 1 and 2. Next, the configuration of the optical communication device 10 according to the present embodiment will be described in more detail.

1-2. Configuration of the Optical Communication Device

Figure 3:
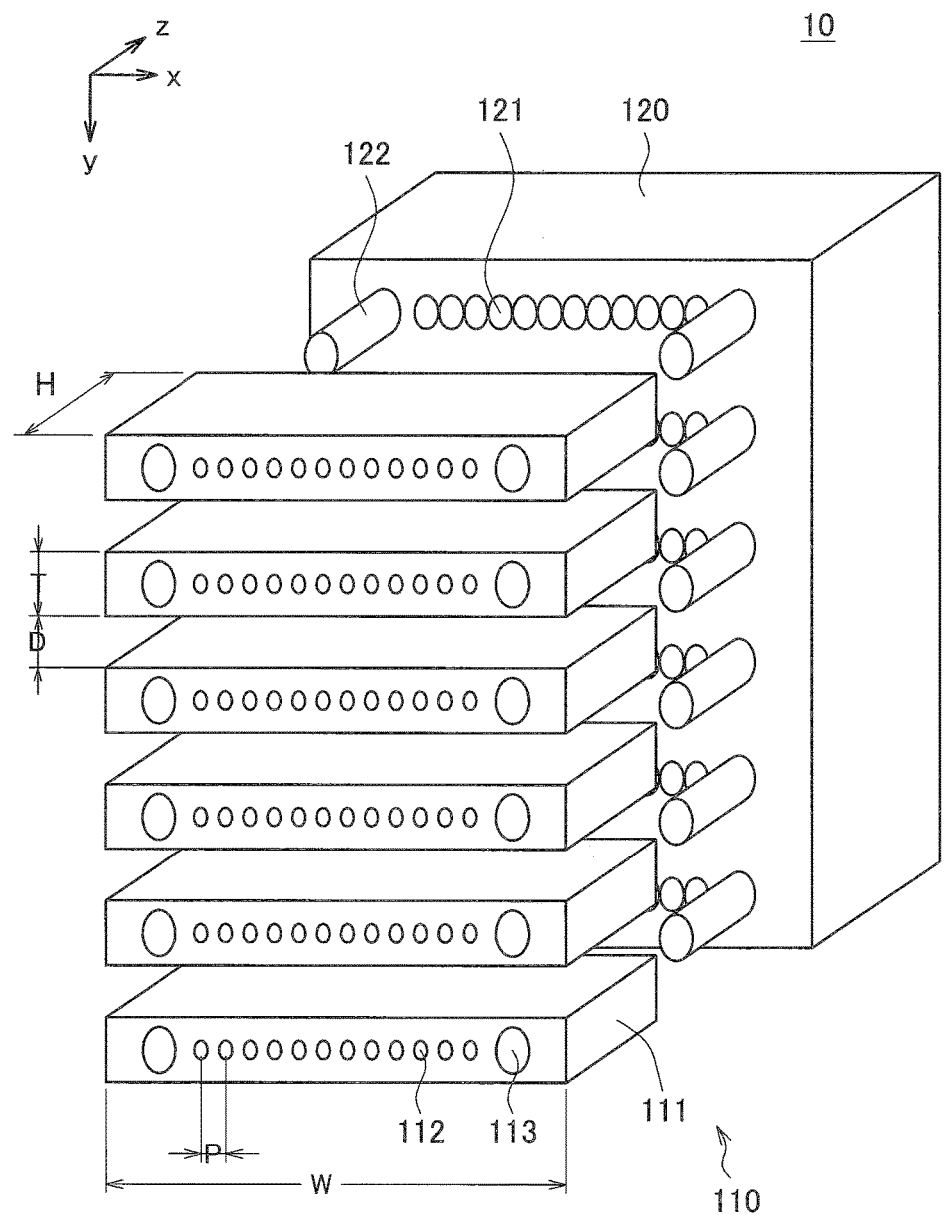
FIG. 3 is an exploded perspective diagram showing a schematic configuration of the optical communication device according to the embodiment.
Figure 4A:
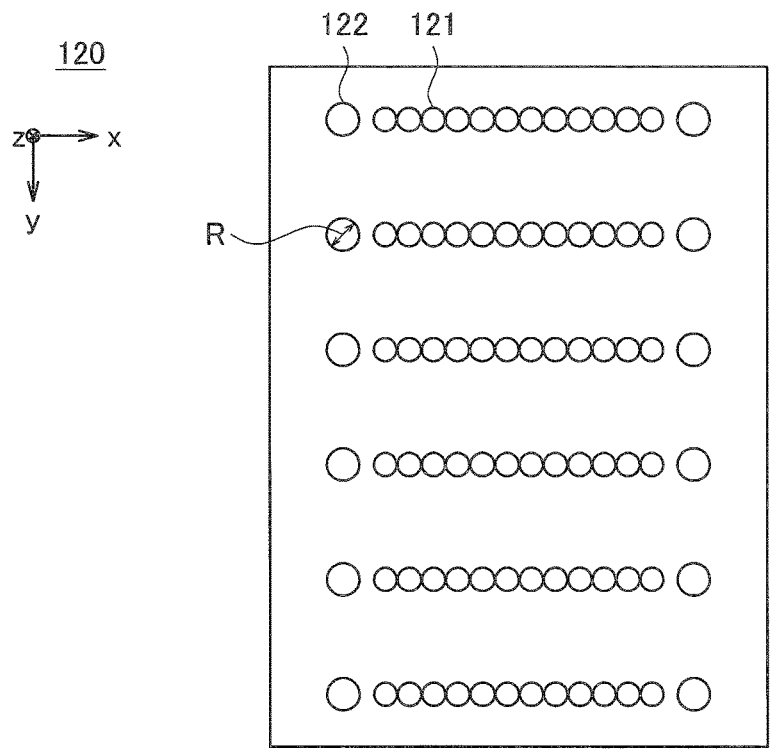
FIG. 4A is a schematic diagram showing a configuration of a lens substrate of the optical communication device according to the embodiment.
Figure 4B:
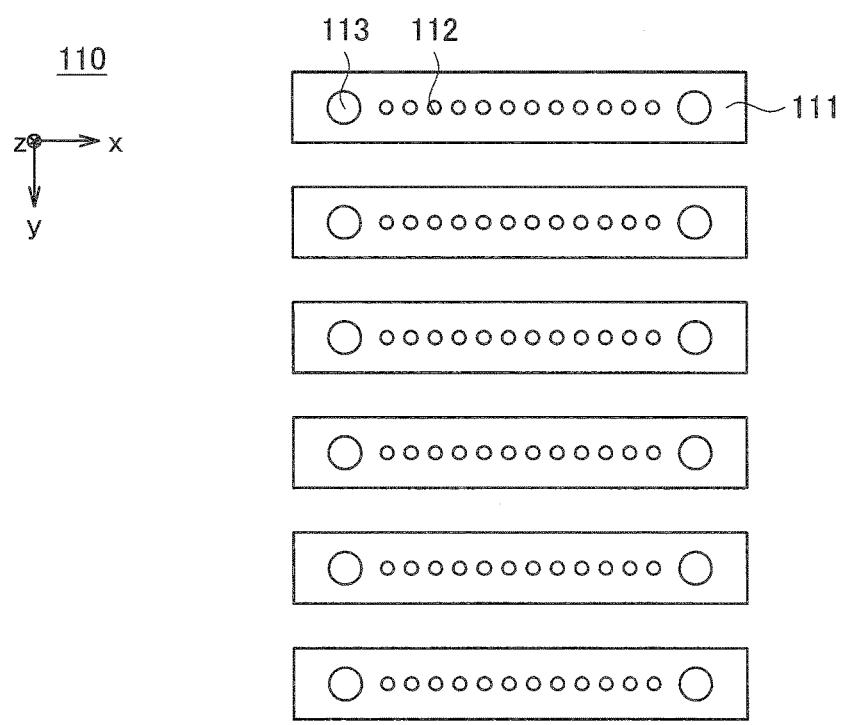
FIG. 4B is a schematic diagram showing a configuration of a ferrule of the optical communication device according to the embodiment.

The configuration of the optical communication device 10 according to the present embodiment will be described with reference to FIGS. 3, 4A, and 4B. FIG. 3 is an exploded perspective diagram showing a schematic configuration of the optical communication device 10 according to the present embodiment. FIG. 4A is a schematic diagram showing a configuration of the lens substrate 120 of the optical communication device 10 according to the present embodiment. FIG. 4B is a schematic diagram showing a configuration of the ferrule 110 of the optical communication device 10 according to the present embodiment. Note that FIGS. 4A and 4B show a state of the lens substrate 120 and the ferrule 110 as viewed in the direction in which the optical fibers 340 are inserted, in other words, viewed from the negative direction of the z axis.

First, a configuration of the lens substrate 120 will be described. Referring to FIGS. 3 and 4A, the lens array in which the plurality of lenses 121 are two-dimensionally arrayed is formed on the lens substrate 120. The lens substrate 120 is formed of a resin-based material, for example, polycarbonate, a polyetherimide (PEI)-based material (for example, ULTEM (a registered trademark)), a polybutylene terephthalate (PBT)-based material (for example, Teralink (a registered trademark)), polyolefin, a cyclic olefin copolymer (COC), or the like. In addition, the lens substrate 120 may be formed of various kinds of glass-based materials. Note that, when the lens substrate 120 is formed of a resin-based material, for example, an injection molding method is used.

Figure 6:
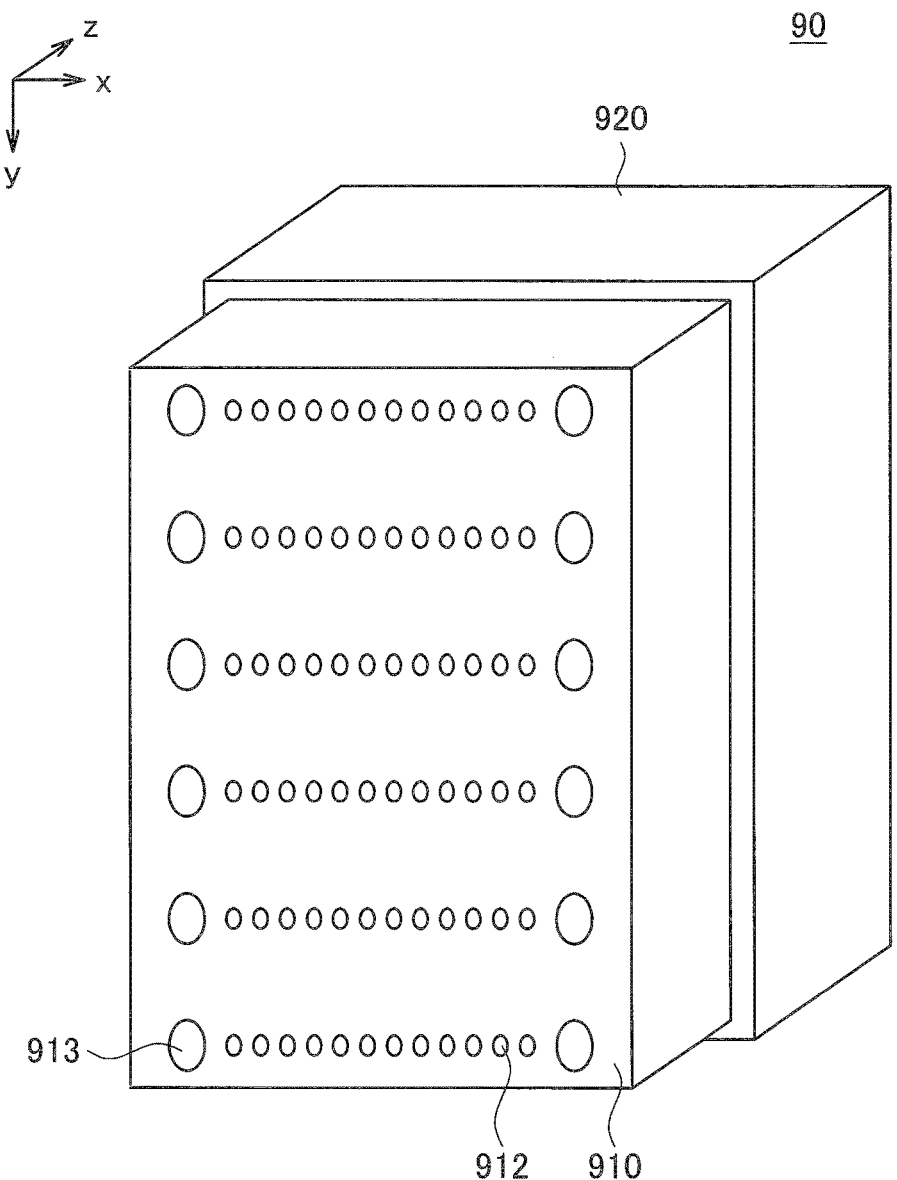
FIG. 6 is a perspective diagram showing a configuration example of a case in which the number of fitting parts that use pins is increased for the general MT ferrule with a lens array shown in FIG. 5.

In the example shown in FIGS. 3 and 4A, 6 lens rows, each of which is formed by 12 lenses 121 arrayed in one row in the x-axis direction, are arrayed in the y-axis direction, and thereby a total of 72 lenses 121 are formed. The distance (pitch) between the centers of lenses 121 in one lens row is about, for example, 250 μm. Since the lenses 121 of the lens substrate 120 are formed to be equal in number to, for example, the channels used in the optical communication as described above, the optical communication device 10 shown in FIGS. 3, 4A, and 4B is compatible with optical communication of, for example, 72 channels. The present embodiment, however, is not limited thereto, and the lenses 121 may be two-dimensionally formed to correspond in number to the channels, or the formations, positions and the number thereof to be formed may be appropriately designed. For example, 12 lenses 121 may be formed to be arranged in one column of the y-axis direction. In description below, in the two-dimensional array of the lenses 121 and the through holes 112 of the ferrule 110 to be described later, a line extending in the x-axis direction is also referred to as a row and a line extending in the y-axis direction is also referred to as a column.

In the vicinity of both ends of each of lens rows of the lens substrate 120, boss parts 122 which are protruding portions are provided. In the example shown in FIGS. 3 and 4A, a total of 12 boss parts 122 are provided at both ends of each of the lens rows. The boss parts 122 are provided as protruding portions in a cylindrical shape having a diameter of, for example, about 500 μm. When the boss parts 122 are fitted into fitting parts 113 of the ferrule 110 to be described later, the ferrule 110 is fixed to the lens substrate 120 at the fitting sites, and thereby the ferrule 110 is connected to the lens substrate 120. For example, the lens substrate 120 and the ferrule 110 are connected to each other via the boss parts 122 and the fitting parts 113 in the state in which the facing surfaces thereof come in contact with each other as shown in FIG. 3.

In addition, in the present embodiment, the boss parts 122 may be integrally molded with the lenses 121 using, for example, the injection molding method. By forming the lenses 121 and the boss parts 122 through integral molding, alignment of the formation positions of the boss parts 122 and those of the lenses 121 can be controlled with high accuracy.

Here, the present embodiment is not limited thereto, and the ferrule 110 and the lens substrate 120 may not be connected to each other by the boss parts 122. For example, if fitting parts which are concave portions are also provide in positions facing the fitting parts 113 of the ferrule 110 in the lens substrate 120 and pins which are separate members fitted into the fitting parts 113 of the ferrule 110 and the fitting parts of the lens substrate 120, the ferrule 110 and the lens substrate 120 may come in contact with and be connected to each other. As such, in the present embodiment, the ferrule 110 and the lens substrate 120 may be connected to each other by the pins in the state in which predetermined faces thereof face each other, and the type of the pins is not limited. The pins may be the boss parts 122 formed on the lens substrate 120 as shown in FIGS. 3 and 4A, or may be separate members from the ferrule 110 and the lens substrate 120 as in the example described above. The ferrule 110 and the lens substrate 120 are fixed at the pin fitting sites, and thereby the ferrule 110 and the lens substrate 120 are fixedly connected to each other.

Next, a configuration of the ferrule 110 will be described. Referring to FIGS. 3 and 4B, the ferrule 110 is divided into a plurality of ferrule members 111 in the row direction within faces parallel to the facing surface. In the example shown in FIGS. 3 and 4B, the ferrule 110 is divided into 6 ferrule members 111 in the row direction within the faces parallel to the facing surface so that one lens row of the lenses 121 of the lens substrate 120 corresponds to one ferrule member 111. The ferrule 110 is formed of a resin-based material, for example, polyphenylene sulfide (PPS), a liquid crystal polymer (LCP), epoxy, or the like.

Here, in the present embodiment, the direction in which the ferrule 110 is divided into the plurality of ferrule members 111 is not limited thereto, and the ferrule 110 may be divided in, for example, the column direction. The direction and the number in which the ferrule 110 is divided may be appropriately designed according to a method of arraying the lenses 121. In addition, in the present embodiment, a region with a predetermined length at least in the direction perpendicular to the facing surface of the ferrule 110 (z-axis direction) may be divided into a plurality of regions in the row direction of the column direction within a plane parallel to the facing surface (within the x-y plane), or for example, partial regions may not be divided but connected to each other. Note that such a configuration example in which the ferrule 110 is not completely divided will be described in [3-2. Modified example in which parts of the ferrule members are connected to each other] below as a modified example of the present embodiment.

The width W of each ferrule member 111 (the length thereof in the x-axis direction) may be, for example, about 5 to 7 mm. In addition, the height H of the ferrule member 111 (the length thereof in the z-axis direction) may be, for example, about 8 mm. In addition, the thickness T of the ferrule member 111 (the length thereof in the y-axis direction) may be, for example, about 0.5 to 2 mm. In addition, the distance D between the ferrule members 111 (the interval between the ferrule members 111 in the y-axis direction) may be, for example, about 0.1 to 3 mm.

In each of the plurality of ferrule members 111, through holes 112 are provided in positions corresponding to the lenses 121 when the ferrule 110 is connected to the lens substrate 120. In the example shown in FIGS. 3 and 4B, the ferrule 110 is divided into 6 ferrule members 111 so as to correspond to each of the lens rows, 12 through holes 112 are formed in each ferrule member 111 to be arrayed in one row in the x-axis direction. When the optical fibers 340 are inserted into each of the through holes 112 from the negative direction of the z axis, the ends of the optical fibers 340 are disposed so as to face each of the lenses 121.

The through holes 112 are formed such that the distance (pitch) P between the centers thereof is, for example, about 250 μm in accordance with the pitch of the lenses 121. In addition, the inner diameter of the through holes 112 may not be constant in the z-axis direction, and may be set to change by stage such that, for example, the inner diameter from the opening of the negative direction of the z axis into which the optical fibers 340 are inserted to a halfway portion is about 200 μm, and the inner diameter from the halfway portion to the other opening of the positive direction of the z axis (in other words, the facing surface to the lenses 121) is about 126 μm. Here, when the optical fibers 340 are inserted into the through holes 112 of the ferrule members 111, the optical fibers 340 may be inserted in the state in which the coating of a predetermined length from the tip of the optical fibers is removed. Thus, in the example described above, the portions of the through holes 112 with the inner diameter of about 200 μm correspond to the outer diameter of the covered portions of the optical fibers 340, and the portions with the inner diameter of about 126 μm correspond to the outer diameter of the portions of the optical fibers 340 whose covering is removed. Note that the numerical values described above are an example of the shape of the through holes 112, and the present embodiment is not limited thereto. For example, the inner diameter of the through holes 112 may be appropriately designed according to the outer diameter of the optical fibers 340.

In addition, the fitting parts 113 into which the boss parts 122 of the lens substrate 120 are fitted are formed in both ends of each of the plurality of ferrule members 111 in the x-axis direction. When the boss parts 122 of the lens substrate 120 are fitted into the fitting parts 113 of the ferrule members 111, both ends of each of the plurality of ferrule members 111 are fixed by the boss parts 122 with respect to the facing surface, and accordingly, the ferrule members 111 are connected to the lens substrate 120.

The fitting parts 113 may be openings having a shape according to the shape of the boss parts 122. In the example shown in FIGS. 3, 4A, and 4B, since the boss parts 122 are provided as protruding portions having a cylindrical shape with the diameter of, for example, about 500 μm, the fitting parts 113 can be formed as openings in a round shape into which the boss parts 122 can be inserted. In the present embodiment, however, as both ends of each of the plurality of ferrule members 111 are fixedly connected to the facing surface by the boss parts 122, the lens substrate 120 and the ferrule 110 are connected to each other, and thus the fitting parts 113 can be formed as openings with a round shape having an inner diameter which enables the boss parts 122 to be inserted thereinto and securing of room which allows fixed fitting of the boss parts.

In addition, the ferrule members 111 can be connected to the lens substrate 120 so that the ferrule members 111 do not come in contact with each other. When, for example, an inclination of each ferrule member 111 in the y-axis direction with respect to the z-axis direction is greater than an angle defined by the tangent between the length H of each ferrule member 111 and the distance D between the ferrule members 111 (arctan (D/H)), the ferrule members 111 come in contact with each other. Thus, the ferrule members 111 are connected to the lens substrate 120 such that the inclination of each ferrule member 111 in the y-axis direction with respect to the z-axis direction is equal to or smaller than an angle defined by the tangent between the length H of each ferrule member 111 and the distance D between the ferrule members 111.

Hereinabove, the configuration of the optical communication device 10 according to the present embodiment has been described with reference to FIGS. 3, 4A, and 4B.

2. Comparison to a General Connector

Herein, in order to further clarify an embodiment of the present disclosure described above, a configuration of an existing general connector for optical fibers will be described, and compared to the optical communication device 10 according to the present embodiment. As described above, the optical communication device 10 according to the present embodiment has the configuration of an MT ferrule with a lens array. For comparison, a configuration of a general MT ferrule with a lens array will be described herein as an example of a general connector for optical fibers.

Figure 5:
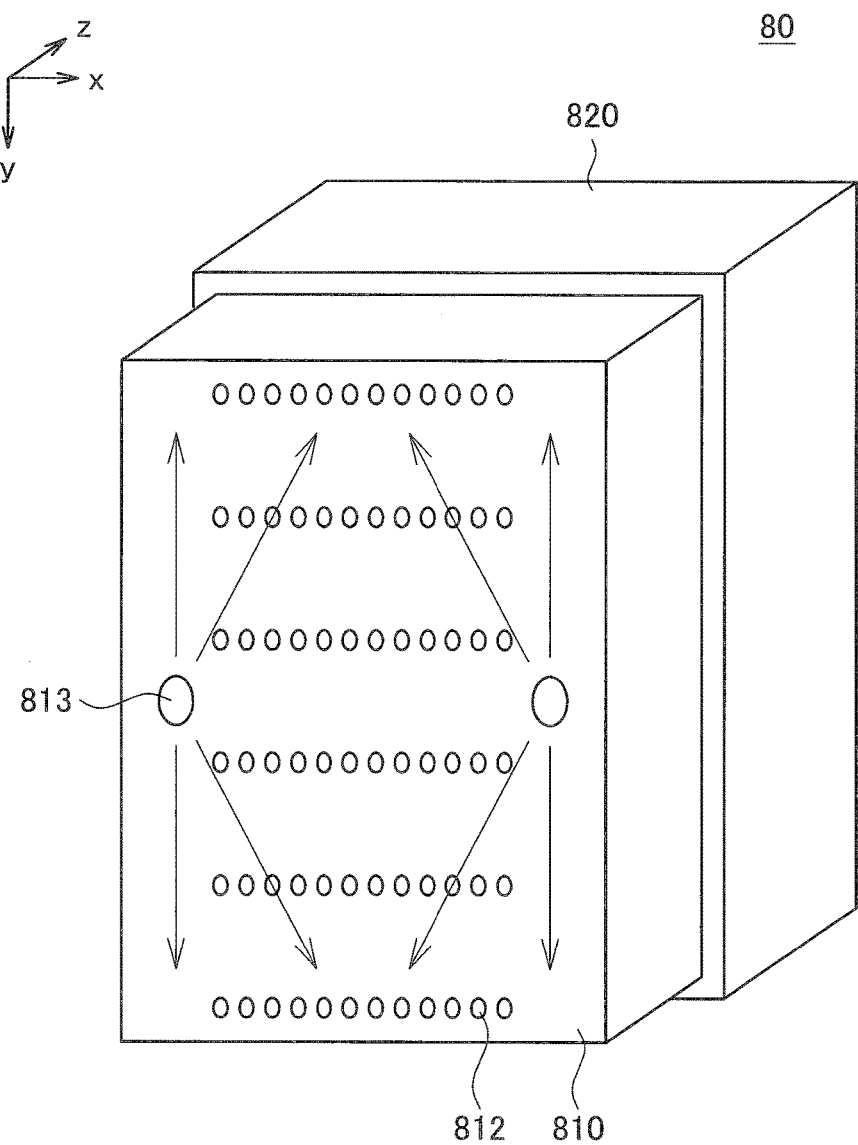
FIG. 5 is a perspective diagram showing a schematic configuration of a general MT ferrule with a lens array.

The configuration of the general MT ferrule with a lens array will be described with reference to FIG. 5. FIG. 5 is a perspective diagram showing a schematic configuration of the general MT ferrule with a lens array. For comparison, the configuration of the general MT ferrule with a lens array which corresponds to optical communication with 72 channels as the optical communication device 10 according to the present embodiment is illustrated.

Referring to FIG. 5, the general MT ferrule 80 with a lens array includes a lens substrate 820 whose first face has a plurality of lenses formed two-dimensionally thereon and a ferrule 810 which is disposed facing a second face that is the face on the opposite side of the first face of the lens substrate 820 and in which through holes 812 into which optical fibers are inserted are provided in positions corresponding to each of the plurality of lenses. FIG. 5 illustrates the state in which the lens substrate 820 is connected to the ferrule 810.

72 lenses (not illustrated) corresponding in number to, for example, the channels of optical communication are two-dimensionally formed on the lens substrate 820. The lens substrate 820 is formed of a resin-based material, for example, polycarbonate, a PEI-based material, a nylon or PBT-based material, polyolefin, a COC, or the like. In addition, the lens substrate 820 may be formed of various kinds of glass-based materials. Note that, when the lens substrate 820 is formed of a resin-based material, for example, the injection molding method is used.

In a general configuration, the ferrule 810 is formed of a single member. The ferrule 810 is formed of a resin-based material, for example, PPS, LCP, epoxy, or the like. In the ferrule 810, 72 through holes 812 are provided corresponding in number to, for example, the lenses in positions facing the lenses of the lens substrate 820 when the ferrule 810 is connected to the lens substrate 820. When the optical fibers are inserted into the through holes 812 from the negative direction of the z axis of the drawing, the ends of the optical fibers are disposed so as to face each of the lenses of the lens substrate 820.

Fitting parts 813 into which one ends of pins are fitted are formed in partial regions within the face on which the through holes 812 of the ferrule 810 are provided. The fitting parts 813 may be openings of a shape according to the cross-sectional shape of the pins. In the example shown in FIG. 5, one of the fitting parts 813 is provided in each of the ends of the x-axis direction within the face on which the through holes 812 of the ferrule 810 are provided, and thus a total of two fitting parts are provided. Although not illustrated, openings are also provided in the lens substrate 820 in positions corresponding to the fitting parts 813 of the ferrule 810, and the other ends of the pins are fitted into the fitting parts. As such, in the general configuration, when both ends of the pins which are separate members from the ferrule 810 and the lens substrate 820 are fitted into the fitting parts provided on the facing surfaces of the ferrule 810 and the lens substrate 820, the ferrule 810 can be fixedly connected to the lens substrate 820 at the fitting sites.

Hereinabove, the configuration of the general MT ferrule 80 with a lens array has been described with reference to FIG. 5. In the general MT ferrule 80 with a lens array, each of the ferrule 810 and the lens substrate 820 is configured of a single member, and they are connected to each other by pins at two different sites within the opposing face as described above.

Herein, in order to compare the general MT ferrule 80 with a lens array described above to the optical communication device 10 according to the present embodiment described above, a connection loss occurring when optical fibers are connected will be described. Optical fibers are configured such that the circumference of the core that is formed of a material having a higher refractive index is covered by a cladding formed of a material having a lower refractive index. As such, by using the difference of the refractive indexes of the core and the cladding, the optical fibers have a structure in which light propagates by the core closer to the center axis. Thus, in order to propagate light more efficiently, it is preferable in the MT ferrule 80 with a lens array for the center axes of the optical fibers to coincide with the optical axes of the lenses provided in the lens substrate 820 as closely as possible. When an amount of positional deviation between the axes is large, there is concern of a loss of light (connection loss) occurring during propagation of light from the optical fibers to the lenses or from the lenses to the optical fibers being substantial. In the MT ferrule 80 with a lens array, since the center axes of the optical fibers substantially coincide with the center axes of the through holes 812 of the ferrule 810 into which the optical fibers are inserted, in order to reduce the connection loss, the formation positions of the through holes 812 and the lenses are required to be controlled with high accuracy so that the center axes of the through holes 812 of the ferrule 810 coincide with the optical axes of the lenses of the lens substrate 820 as exactly as possible.

The connection loss L (dB) caused by the positional deviation between the center axes of the optical fibers (in other words, the center axes of the through holes 812) and the optical axes of the lenses (which is also referred to hereinafter as axial deviation) can be expressed using the following formula (1).

$$L = -10\log\left(\exp\left(-\left(\frac{d}{\omega}\right)^2\right)\right) \quad (1)$$

Note that d is an amount of axial deviation, and w is a mode field radius.

According to formula (1) shown above, when the amount of axial deviation d is 1 μm, for example, the connection loss is about 0.2 dB. In addition, in order to suppress the connection loss to a value equal to or lower than 2 dB, for example, the amount of axial deviation d is required to be suppressed to a value equal to or lower than 10 μm.

Here, in the general MT ferrule 80 with a lens array, the ferrule 810 is connected to the lens substrate 820 by the pin as described above. When the ferrule 810 is connected to the lens substrate 820 by the pin, the formation positions of the through holes 812 of the ferrule 810 and the lenses of the lens substrate 820 are decided using the fitting positions of the pin as a reference for alignment. Thus, when a relative positional relation between the fitting parts 813 and the through holes 812 within the face of the ferrule 810 and a relative positional relation between the fitting parts and the lenses within the face of the lens substrate 820 change, the amount of axial deviation is considered to be large.

Now, a case in which a use environment of the MT ferrule 80 with a lens array changes and a temperature of the ferrule 810 and the lens substrate 820 changes is assumed. All of the resin-based materials (PPS, LCP, epoxy, and the like) used to form the ferrule 810 described above are known to have linear expansion coefficients of about 23 ppm. In addition, all of the resin-based materials (polycarbonate, ULTEM, Teralink, and the like) used to form the lens substrate 820 described above are known to have linear expansion coefficients of about 70 to 100 ppm. Furthermore, when the lens substrate 820 is formed of a glass-based material, a linear expansion coefficient thereof is known as being about 3 to 4 ppm. Thus, when a temperature change occurs, a change amount of the relative positional relation between the fitting parts 813 and the through holes 812 within the face of the ferrule 810 is significantly different from a change amount of the relative positional relation between the fitting part and the lenses within the face of the lens substrate 820. As such, since the ferrule 810 and the lens substrate 820 are formed of different materials in the general configuration, when a temperature change occurs, there is a possibility of the positions of the optical axes of the lenses and the center axes of the optical fibers substantially deviating due to the difference in the linear expansion coefficients of the material forming the ferrule 810 and of the material forming the lens substrate 820.

In addition, the ferrule 810 and the lens substrate 820 are fixedly connected to each other by the pin at the fitting sites. Thus, as the distance from the fitting sites increases, a change amount of the position caused by a temperature change increases. For example, when a large number of the through holes 812 of the ferrule 810 and the lenses of the lens substrate 820 are two-dimensionally provided in order to correspond to multi-channel optical communication of which the number of channels exceeds 60 as shown in FIG. 5, the areas of the facing surfaces of the ferrule 810 and the lens substrate 820 become large. Thus, in the example shown in FIG. 5, for example, the distance from the fitting parts 813 to the through holes 812 and the lenses provided at the ends in the y-axis direction becomes relatively long, and thus influence of a position change of the through holes 812 and the lenses caused by a temperature change on an amount of axial deviation also becomes significant. According to an approximate calculation by the present inventors, when a temperature increases by 50 degrees from a normal temperature in the example shown in FIG. 5, for example, the amount of axial deviation reaches several μm or more at maximum, and thus occurrence of a serious connection loss is a concern. In FIG. 5, regions at relatively long distances from the fitting parts 813 are schematically illustrated using arrows starting from the fitting parts 813.

Here, in the general configuration, as one method for suppressing a position change of the through holes 812 within the face of the ferrule 810 and a position change of the lenses within the face of the lens substrate 820 caused by a temperature change, an increase of the number of fitting parts of the ferrule 810 and the lens substrate 820 using pins is considered. By increasing the number of fitting parts, the number of fixing spots of the ferrule 810 and the lens substrate 820 increases, and therefore the effect of reducing the amount of relative positional deviation between the ferrule 810 and the lens substrate 820 within the face therebetween is expected.

A configuration example of the case in which the number of fitting parts is increased in the general configuration as described above is shown in FIG. 6. FIG. 6 is a perspective diagram showing the configuration example of the case in which the number of fitting parts that use pins is increased for the general MT ferrule 80 with a lens array shown in FIG. 5.

Referring to FIG. 6, an MT ferrule 90 with a lens array includes a lens substrate 920 whose first face has a plurality of lenses formed two-dimensionally thereon and a ferrule 910 which is disposed facing a second face that is the face on the opposite side of the first face of the lens substrate 920 and in which through holes 912 into which optical fibers are inserted are provided at positions corresponding to each of the plurality of lenses. Note that the MT ferrule 90 with a lens array has more fitting parts than the MT ferrule 80 with a lens array shown in FIG. 5 and other configurations thereof are the same as the MT ferrule 80 with a lens array, and thus detailed description with respect to overlapping configurations will be omitted.

72 lenses (not illustrated) corresponding to the number of channels of optical communication, for example, are formed two-dimensionally on the lens substrate 920. The lens substrate 920 corresponds to the lens substrate 820 shown in FIG. 5.

The ferrule 910 is constituted by a single member. 72 through holes 912 corresponding to the number of lenses, for example, are provided in the ferrule 910 at positions facing the lenses of the lens substrate 920 when the ferrule 910 is connected to the lens substrate 920. Note that a configuration of the through holes 912 is the same as that of the through holes 812 of the ferrule 810 shown in FIG. 5.

A plurality of fitting parts 913 into which one end of each of pins is fitted are formed within the face on which the through holes 912 of the ferrule 910 are provided. The fitting parts 913 correspond to the fitting parts 813 shown in FIG. 5, and may be openings having a shape according to the cross-sectional shape of the pins. In the example shown in FIG. 6, the fitting parts 913 are formed at both ends of each of rows of the through holes 912 which are lined two-dimensionally within the facing surface of the ferrule 910, and thus are formed at a total of 12 spots. In addition, although not illustrated, fitting parts configured with openings are also provided in the lens substrate 920 at positions corresponding to the fitting parts 913 of the ferrule 910, and the other ends of the pins are fitted into the fitting parts.

As described above, as a larger number of fitting parts 913 are provided and the ferrule 910 and the lens substrate 920 are connected to each other at a larger number of spots, the ferrule 910 and the lens substrate 920 are fixed to each other at a larger number of spots as described above, and thus there is a possibility of a reduction in an amount of positional deviation between the center axes of the through holes 912 and the optical axes of the lenses caused by a temperature change.

When the ferrule 910 and the lens substrate 920 are connected to each other via the pins, however, alignment of the fitting parts 913 provided in the ferrule 910 with the fitting parts provided in the lens substrate 920 within their facing surfaces should be performed with high accuracy. When an amount of positional deviation between the center axes of the openings of the facing fitting parts is large, there is a concern that it may be difficult to fit both ends of the pins into the fitting parts of both sides. Thus, in order to realize the configuration shown in FIG. 6, it is necessary to perform both of positioning of the fitting parts 913 within the facing surface of the ferrule 910 and positioning of the fitting parts within the facing surface of the lens substrate 920 with high accuracy. In order to cause the pins to be fitted into all of the fitting parts with no problems when the number of fitting parts is increased, the hole diameter of the fitting parts should be increased in consideration of manufacturing discrepancies. According to review by the present inventors, when a temperature changes only by 10 degrees in the ferrule 910 and the lens substrate 920, for example, an amount of positional deviation between the fitting parts reaches about 8.7 μm. Thus, it is necessary to secure ±10 to 20 μm as a matching margin for the hole diameter when the fitting parts are formed in the example shown in FIG. 6. If the matching margin of the hole diameter of the fitting parts is set to be larger, accuracy in alignment of the center axes of the through holes 912 with the optical axes of the lenses deteriorates accordingly, and as a result, there is also a possibility of an amount of axial deviation increasing.

As described above, there is a possibility of the amount of positional deviation between the center axes of the through holes 812 and the optical axes of the lenses increasing due to a temperature change in the general MT ferrule 80 with a lens array. In order to suppress the deviation, increasing the number of fitting parts of the pins, in other words, the number of fixing positions of the ferrule 910 and the lens substrate 920 using the pins, in the MT ferrule 90 with a lens array is also considered, however, it is difficult to align a large number of fitting parts with high accuracy, and when the matching margin at the time of formation of the fitting parts is considered, there is an unavoidable possibility of an amount of positional deviation between the center axes of the through holes 912 and the optical axes of the lenses increasing.

On the other hand, the optical communication device 10 according to the present embodiment has the ferrule 110 which is divided into the plurality of ferrule members 111 in, for example, the row direction as described above. Thus, a position change of the through holes 112 within the face of the ferrule 110 is just a position change thereof within the ferrule members 111 in the row direction, and therefore it is not necessary to consider a two-dimensional position change of the through holes 112 caused by two-dimensional thermal deformation, unlike the general MT ferrule 80 with a lens array. In addition, in the present embodiment, the fitting parts 113 into which the boss parts 122 of the lens substrate 120 are fitted are formed at both ends of each of the plurality of ferrule members 111 in the row direction thereof. Thus, in the present embodiment, the ferrule members 111 are fixed to the lens substrate 120 at both ends of each of the ferrule members 111. Hence, even when a temperature change occurs and accordingly the lens substrate 120 and the ferrule members 111 are deformed, an amount of deformation in the row direction corresponds to an amount of deformation of the respective elements. Therefore, an amount of deviation between the center axes of the through holes 112 and the optical axes of the lenses 121 can be suppressed better. According to a calculation by the present inventors, if the lens substrate 120 is formed of a glass-based material, for example, in the configuration shown in FIG. 3, the amount of deviation between the center axes of the through holes 112 and the optical axes of the lenses 121 is about 4 μm, and thus a connection loss can be drastically suppressed.

In addition, when both ends of the pins, each of which is a separate member from the ferrule 810 and the lens substrate 820, are fitted into the fitting parts provided on the facing surfaces of the ferrule 810 and the lens substrate 820 in the general MT ferrule 80 with a lens array as described above, the ferrule 810 and the lens substrate 820 are connected to each other. Thus, the formation positions of the through holes 812 of the ferrule 810 and the lenses of the lens substrate 820 are decided with reference to alignment of the positions in which the fitting parts into which the pins are fitted are provided in the general MT ferrule 80 with a lens array. Hence, since an amount of deviation between the optical axis of each lens and the center axis of each optical fiber is linked to an amount of deviation between the formation position of each through hole 812 and that of each fitting part in the ferrule 810 and an amount of deviation between the formation position of each lens and that of each fitting part in the lens substrate 820, it is difficult to control alignment of the optical axis of each lens with the center axis of each optical fiber overall with high accuracy.

On the other hand, the boss parts 122 which connect the ferrule 110 and the lens substrate 120 to each other may be integrally molded with the lenses 121 of the lens substrate 120 in the optical communication device 10 according to the present embodiment as described above. By integrally molding the boss parts 122 with the lenses 121, positioning of the boss parts 122 of the lenses 121 within the facing surface of the lens substrate 120 can be controlled with high accuracy. Thus, since it is better to mainly consider the amount of deviation between the formation position of each through hole 112 and the formation position of each fitting part 113 in the ferrule 110 in order to control the amount of deviation between the optical axis of each lens 121 and the center axis of each through hole 112, the alignment of the optical axis of each lens 121 with the center axis of each through hole 112 can be performed with high accuracy.

In addition, there are many processes in insertion of the optical fibers 340 into the ferrule 110, and thus it is necessary to use a dedicated apparatus for the processes. For example, it is necessary to perform, for example, a process of removing the coating of the tips of the optical fibers 340, a process of grinding the end faces of the optical fibers 340 after the optical fibers 340 are inserted into the ferrule 110 to neatly arrange the end faces on the same plane, and the like. On the other hand, when optical communication with a plurality of channels is performed using the plurality of optical fibers 340 in the field of optical communication, 12 optical fibers 340 are used as one set in most cases, and a multiple of 12 channels are generally used. Thus, many technologies targeting 12 optical fibers 340 in the processes performed when the optical fibers 340 are inserted and an apparatus for performing the processes have been proposed. Therefore, when the 72 optical fibers are inserted into the 72 through holes 812 or 912 provided two-dimensionally as in the configuration of the MT ferrule 80 or 90 with a lens array shown in FIGS. 5 and 6, for example, there is concern that it is difficult to utilize the existing methods and apparatuses without change and the difficulty results in a rise in costs.

On the other hand, in the optical communication device 10 according to the present embodiment, the ferrule 110 is constituted by the plurality of ferrule members 111 and 12 through holes 112 are each arrayed in one row in each of the ferrule members 111 as described above. Thus, when the optical communication device 10 is assembled, the ferrule members 111 can each be connected to the lens substrate 120 after the optical fibers 340 are inserted into each of the ferrule members 111 in the present embodiment. The existing technologies and existing apparatuses can be applied to the insertion of the optical fibers 340 into each of the ferrule members 111, and thus a rise in costs in the insertion process of the optical fibers 340 into the ferrule 110 resulting from an increase of the number of channels can be suppressed.

3. Modified Examples

Next, several modified examples of the present embodiment will be described. The present embodiment may take the following configurations.

3-1. Modified Example in which Supporting Members for Suppressing Deformation of Ferrule Members are Added In the optical communication device 10 according to the present embodiment, the ferrule 110 is constituted by the plurality of ferrule members 111 as shown in FIG. 3. In addition, the plurality of ferrule members 111 are arrayed with predetermined intervals therebetween such that the distance D between the ferrule members 111 (the distance between the ferrule members 111 in the y-axis direction) is about, for example, 0.1 to 3 mm as described above. As such, the ferrule members 111 can be connected to the lens substrate 120 with the ferrule members 111 not coming in contact with each other.

Here, when a case in which a temperature change occurs in the optical communication device 10 is considered, there is a possibility of the ferrule members 111 being deformed, warped, or tilting due to heat. For example, the height H (the length in the z-axis direction) of the ferrule members 111 is 8 mm and the distance D between the ferrule members 111 is 1.05 mm in the configuration shown in FIG. 3, the ferrule members 111 are assumed to tilt in the y-axis direction with respect to the z-axis direction due to deformation caused by heat. In this case, if the tilting is assumed to be linear for simplicity, when the ferrule members 111 tilt only about 7.5 degrees based on a calculation result of arctan (1.05 mm/8 mm), the ferrule members 111 come in contact with each other.

Figure 7:
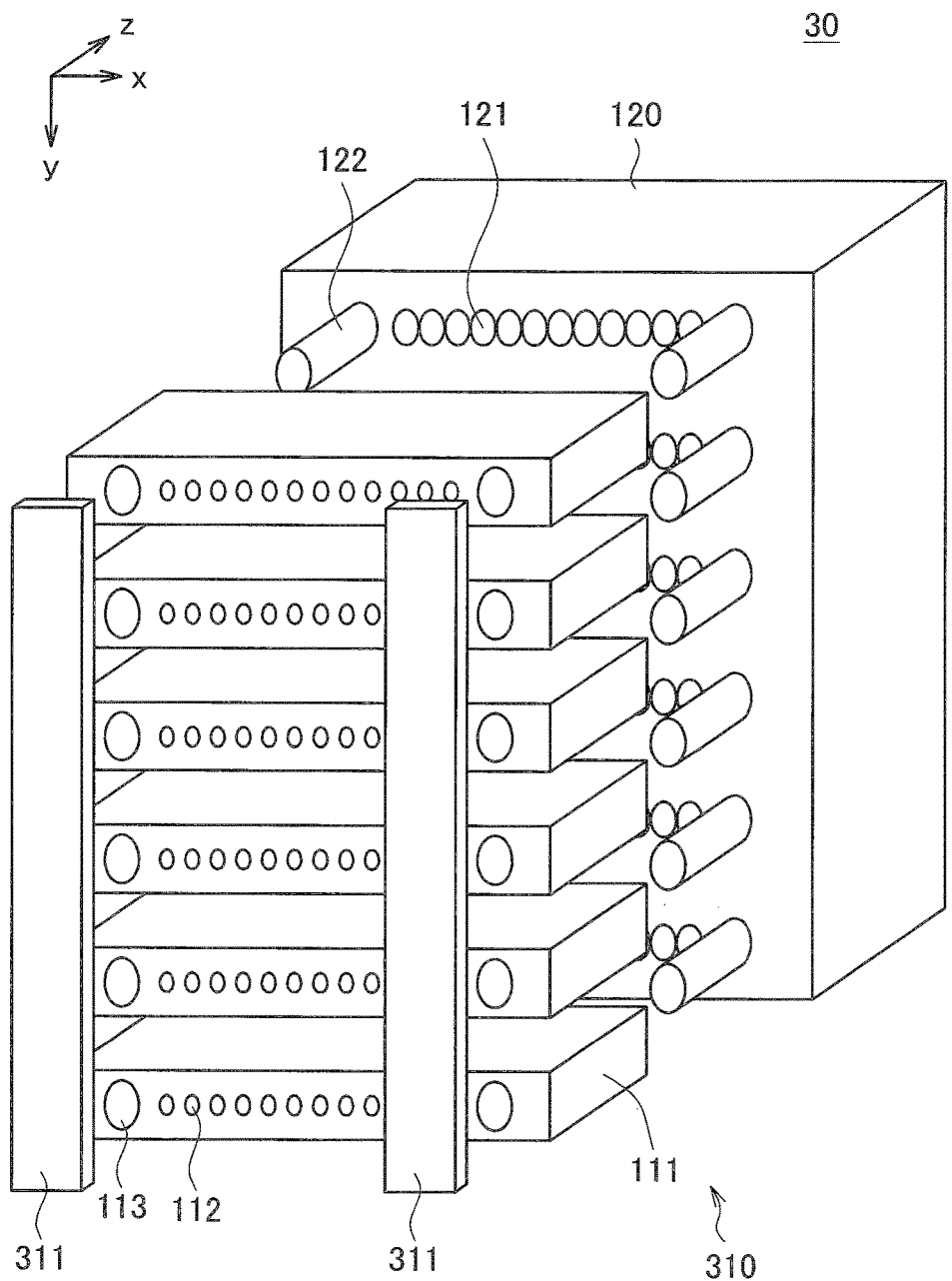
FIG. 7 is an exploded perspective diagram showing a schematic configuration of an optical communication device according to a modified example in which supporting members for suppressing deformation of ferrule members are added.

Therefore, in the present modified example, supporting members for suppressing such deformation of the ferrule members 111 and preventing contact of the ferrule members 111 are added to the configuration of the optical communication device 10 shown in FIG. 3. Referring to FIG. 7, the modified example in which the supporting members for suppressing deformation of the ferrule members 111 are added to the configuration of the optical communication device 10 shown in FIG. 3 will be described. FIG. 7 is an exploded perspective diagram showing a schematic configuration of an optical communication device according to the modified example in which the supporting members for suppressing deformation of the ferrule members 111 are added.

Referring to FIG. 7, an optical communication device 30 according to the modified example includes a lens substrate 120 whose first face has a plurality of lenses 121 formed two-dimensionally thereon and a ferrule 310 which is disposed facing a second face that is the face on the opposite side of the first face of the lens substrate 120 and in which through holes 312 into which optical fibers are inserted are provided at positions corresponding to each of the plurality of lenses 121. Note that the optical communication device 30 according to the present modified example corresponds to the configuration in which the supporting members 311 to be described later are added to the ferrule 110 of the optical communication device 10 shown in FIG. 3. Since other configurations thereof are the same as the optical communication device 10, detailed description of overlapping matters will be omitted.

As shown in FIG. 7, the ferrule 310 according to the modified example has a plurality of ferrule members 111 divided in the row direction and the stick-like supporting members 311 which are provided on the face on the opposite side of the facing surface of the ferrule members 111 lying over the plurality of ferrule members 111. The stick-like supporting members 311 stretch in the y-axis direction, and then are fixedly connected to each of the plurality of ferrule members 111 in that direction. In addition, the supporting members 311 may each be provided at both ends of the array direction of the row direction of the through holes 112 of the ferrule members 111 (in other words, both ends in the x-axis direction) as shown in FIG. 7.

The supporting members 311 have, for example, a relatively small linear expansion coefficient and elastic modulus and are formed of a material that is difficult to deform by heat and external force. Thus, even when a temperature change occurs and thus the ferrule members 111 are likely to deform, the supporting members 311 suppress the deformation. Accordingly, tilting and warpage of the ferrule members 111 caused by the temperature change are suppressed, and contact of the ferrule members 111 is prevented.

Figure 8:
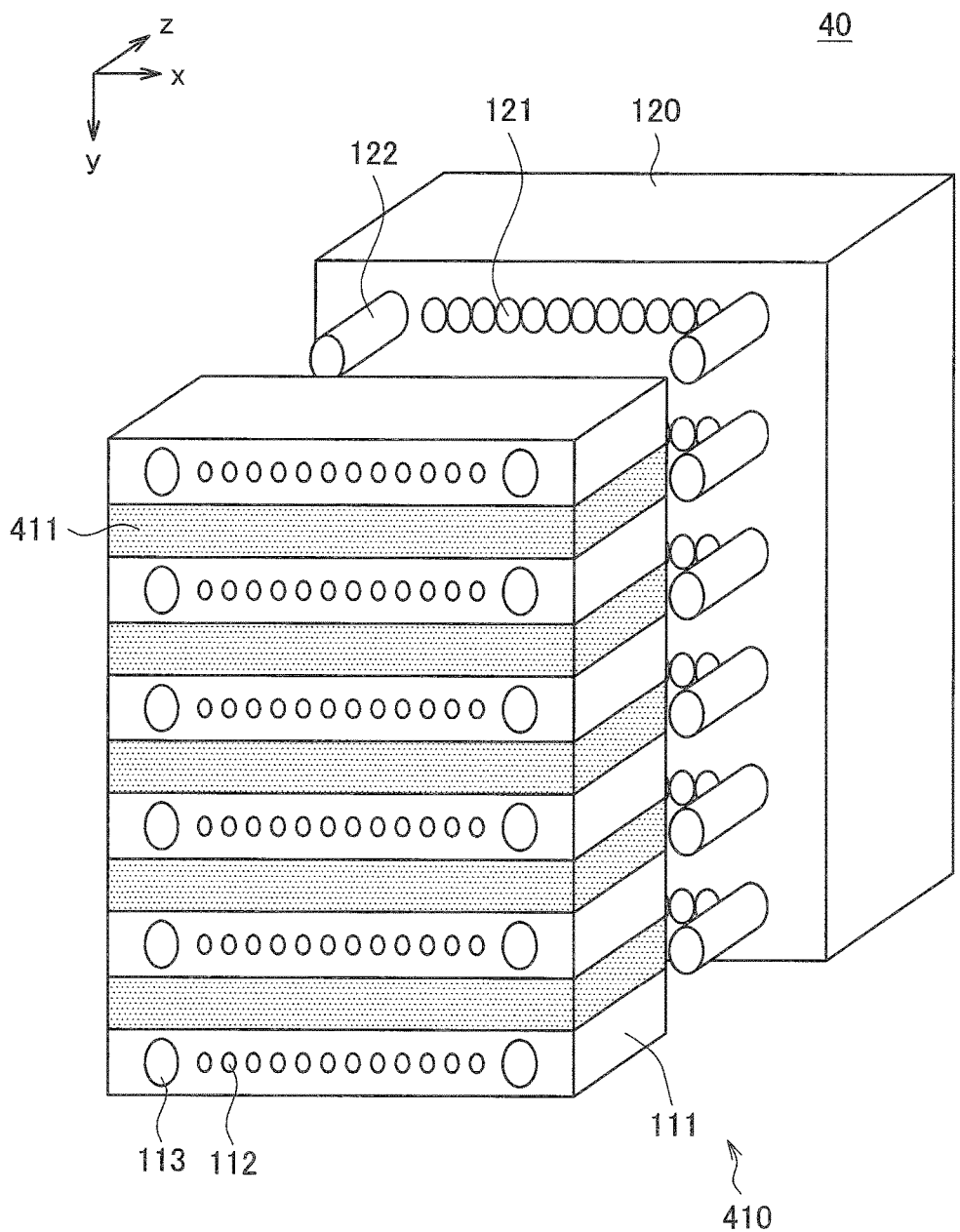
FIG. 8 is an exploded perspective diagram showing a schematic configuration of an optical communication device according to a modified example in which supporting members for suppressing deformation of ferrule members are added.

Herein, in the present modified example, supporting members for suppressing the deformation of the ferrule members 111 are not limited to the stick-like supporting members 311 described above, and may have other shapes. Referring to FIG. 8, a modified example in which supporting members having other shapes are added as such supporting members for suppressing deformation of the ferrule members 111 will be described. FIG. 8 is an exploded perspective diagram showing a schematic configuration of an optical communication device according to another modified example in which supporting members for suppressing deformation of ferrule members 111 are added.

Referring to FIG. 8, the optical communication device 40 according to the present embodiment includes a lens substrate 120 whose first face has a plurality of lenses 121 formed two-dimensionally thereon and a ferrule 410 which is disposed facing a second face that is the face on the opposite side of the first face of the lens substrate 120 and in which through holes 412 into which optical fibers are inserted are provided at positions corresponding to each of the plurality of lenses 121. Note that the optical communication device 40 according to the present modified example corresponds to the configuration in which supporting members 411 to be described later are added to the ferrule 110 in the configuration of the optical communication device 10 shown in FIG. 3. Since other configurations thereof are the same as the optical communication device 10, detailed description of overlapping matters will be omitted.

As shown in FIG. 8, the ferrule 410 according to the present modified example includes a plurality of ferrule members 111 divided in the row direction and the supporting members 411 provided between the ferrule members 111. The supporting members 411 are placed so as to fill each of the gaps between the ferrule members 111.

The supporting members 411 have, for example, a relatively small linear expansion coefficient and elastic modulus and are formed of a material that is difficult to deform by heat and external force. Thus, even when a temperature change occurs and thus the ferrule members 111 are likely to deform, the supporting members 411 suppress the deformation. Accordingly, tilting and warpage of the ferrule members 111 caused by the temperature change are suppressed, and contact of the ferrule members 111 is prevented.

Hereinabove, the modified example in which the supporting members for preventing contact of the ferrule members 111 are added to the configuration of the optical communication device 10 shown in FIG. 3 has been described. In the present modified examples, the supporting members 311 and 411 are appropriately provided so as to suppress deformation caused by a temperature change in the ferrule members 111 as described above. Therefore, tilting and warpage of the ferrule members 111 caused by the temperature change are suppressed, and thereby contact of the ferrule members 111 is prevented.

3-2. Modified Example in which Parts of the Ferrule Members are Connected to Each Other In the optical communication device 10 according to the present embodiment described above, the ferrule 110 is divided into the plurality of ferrule members 111 and the ferrule members 111 do not come in contact with each other.

The present embodiment, however, is not limited thereto, and a region with a predetermined length of the ferrule 110 at least in the direction perpendicular to the facing surface (z-axis direction) may be divided into a plurality of regions in the row direction or the column direction within a plane parallel to the facing surface (within the x-y plane), or for example, the ferrule members may be connected to each other without dividing partial regions thereof.

Figure 9:
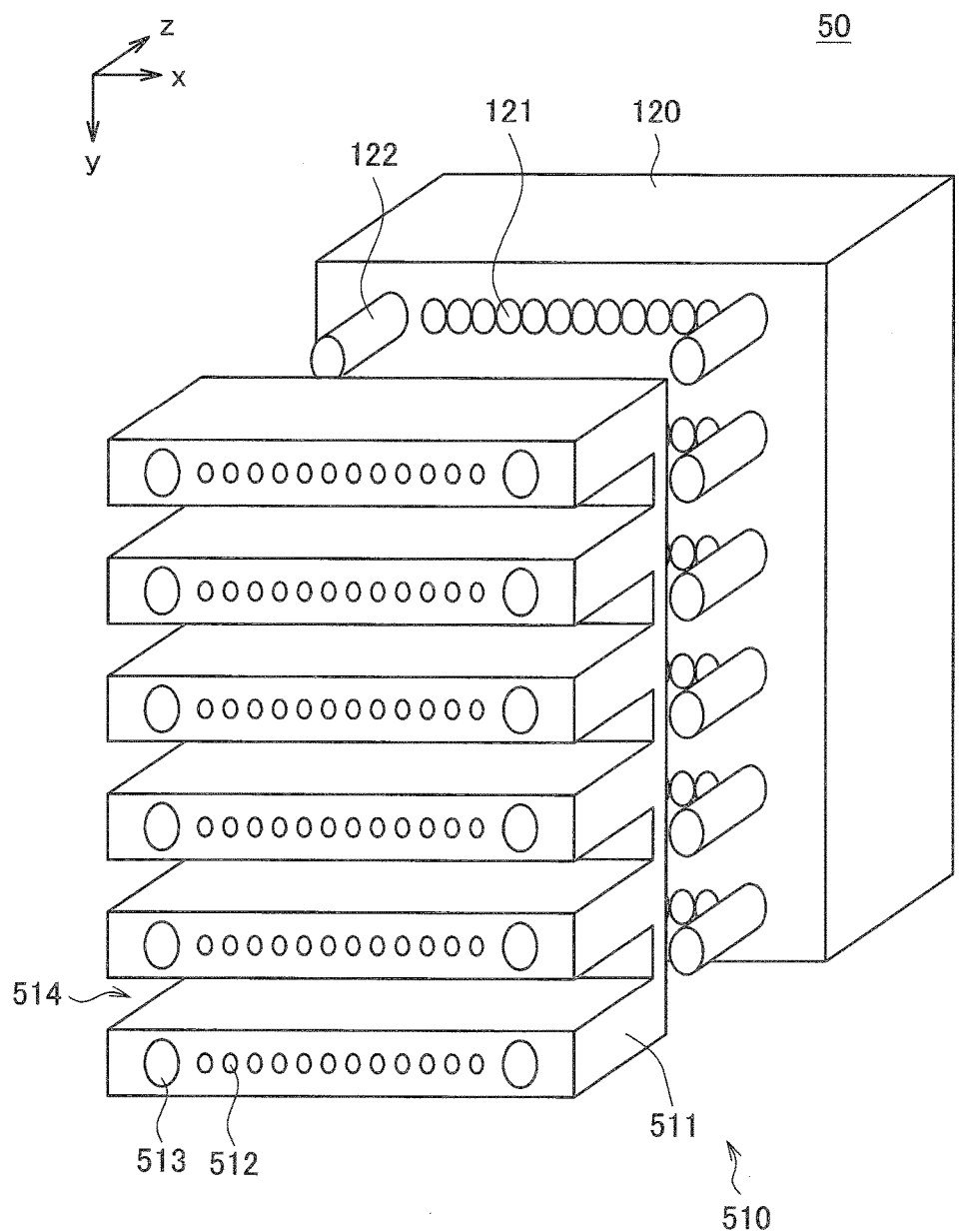
FIG. 9 is an exploded perspective diagram showing a schematic configuration of an optical communication device according to a modified example in which parts of ferrule members are connected to each other.

Referring to FIG. 9, a modified example in which parts of the ferrule members 111 are connected to each other in the optical communication device 10 shown in FIG. 3 will be described. FIG. 9 is an exploded perspective diagram showing a schematic configuration of an optical communication device according to the modified example in which parts of ferrule members 111 are connected to each other Referring to FIG. 9, the optical communication device 50 according to the modified example includes a lens substrate 120 whose first face has a plurality of lenses 121 formed two-dimensionally thereon and a ferrule 510 which is disposed facing a second face that is the face on the opposite side of the first face of the lens substrate 120 and in which through holes 512 into which optical fibers are inserted are provided at positions corresponding to each of the plurality of lenses 121. Note that the optical communication device 50 according to the present modified example corresponds to the configuration in which ferrule members 111 are connected to each other in partial regions thereof in the configuration of the optical communication device 10 shown in FIG. 3. Since other configurations thereof are the same as those of the optical communication device 10, detailed description of overlapping matters will be omitted.

On the surface of the ferrule 510 facing the lens substrate 120, through holes 512 into which optical fibers are inserted are provided at positions facing the plurality of lenses 121 provided on the lens substrate 120. The through holes 512 are formed two-dimensionally within the surface corresponding to the lenses 121 of the lens substrate 120.

Here, the region of the ferrule 510 according to the present modified example having a predetermined length in the direction perpendicular to the facing surface (z-axis direction) is divided into a plurality of regions 511 in the row direction within a plane parallel to the facing surface (within the x-y plane) as shown in FIG. 9. Specifically, the ferrule 510 has a plurality of grooves 514 stretching in the row direction on the face on the opposite side of its facing surface and the plurality of regions 511 are formed in the row direction due to the grooves 514. The ferrule 510 is divided into the regions 511 each having one row in which 12 through holes 512 are lined in the x-axis direction. In addition, fitting parts 513 into which boss parts 122 provided on the lens substrate 120 are fitted are provided on both ends of each region 511 of the through holes 512 in the array direction. When the boss parts 122 are fitted into the fitting parts 513, the ferrule 510 and the lens substrate 120 are connected to each other in the state in which both ends of each region 511 are fixed.

As such, the ferrule 510 is divided in the row direction on the face on which the optical fibers are inserted, and the facing surface thereof to the lens substrate 120 is configured to be an even face. Thus, it can be said that the plurality of ferrule members 111 are configured to be connected to each other only on the facing surface in the configuration of the optical communication device 10 shown in FIG. 3. Even when the ferrule 510 is not completely divided as in the present modified example, it is possible to set an amount of deformation of the ferrule 510 in the row direction and an amount of deformation of the lens substrate 120 in the row direction to correspond to each other when a temperature change occurs by appropriately forming a shape of the grooves 514 including a width, depth, and the like.

Note that the ferrule 510 according to the present embodiment may be formed as a single-body member, or may be configured such that the plurality of ferrule members 111 are formed as in the configuration shown in FIG. 3 and then some of the members are connected by a separate member. In addition, although the case in which the facing surface of the ferrule 510 is formed as an even face, in other words, the ferrule members 111 are configured to be connected to each other on the facing surface, has been described above, the present modified example is not limited thereto. The positions at which the ferrule members 111 are connected to each other are not limited to positions corresponding to the facing surface, and may be set to other locations. In the present modified example, the amount of deformation of the ferrule 510 in the row direction and the amount of deformation of the lens substrate 120 in the row direction when a temperature change occurs may be set to correspond to each other, and positions at which the ferrule members 111 are connected to each other may be appropriately selected.

3-3. Modified Example in which a Lens Substrate is Divided into a Plurality of Members In the optical communication device 10 according to the present embodiment described above, the lens substrate 120 is formed of a single member, and the ferrule 110 is divided into the plurality of ferrule members 111 within the plane parallel to its facing surface. The present embodiment, however, is not limited thereto, and the lens substrate 120 may be divided into a plurality of members in the row direction or the column direction within the plane parallel to its facing surface.

Figure 10:
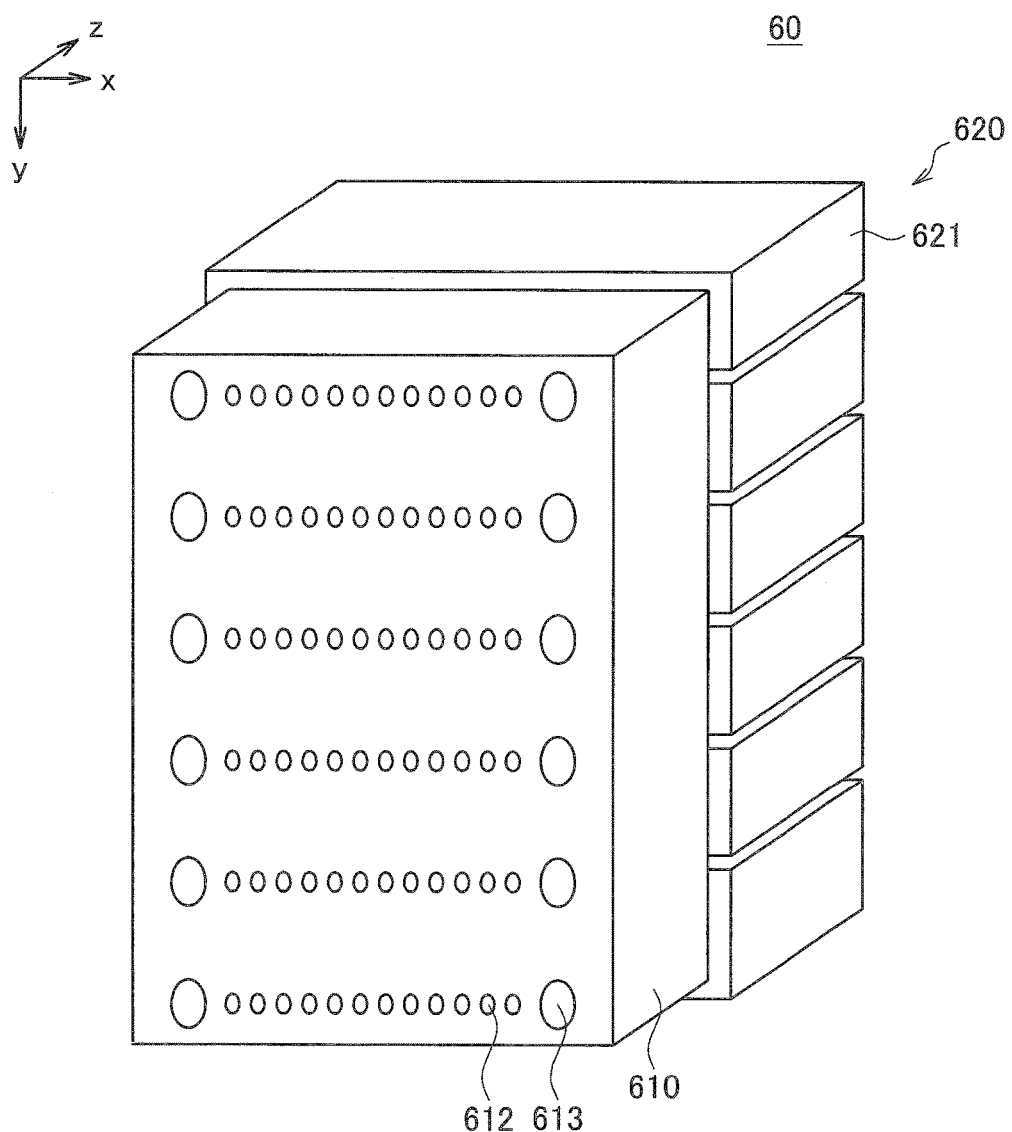
FIG. 10 is a perspective diagram showing a schematic configuration of an optical communication device according to a modified example in which a lens substrate is divided into a plurality of members.

A modified example in which a lens substrate is divided into a plurality of members will be described with reference to FIG. 10. FIG. 10 is a perspective diagram showing a schematic configuration of an optical communication device according to the modified example in which the lens substrate is divided into the plurality of members.

Referring to FIG. 10, the optical communication device 60 according to the modified example includes a lens substrate 620 whose first face has a plurality of lenses formed two-dimensionally thereon, and a ferrule 610 which is disposed facing a second face that is the face on the opposite side of the first face of the lens substrate 620 and in which through holes 612 into which optical fibers are inserted are provided at positions corresponding to each of the plurality of lenses.

The plurality of lenses (not illustrated) corresponding in number to the channels of optical communication, for example, are formed two-dimensionally on the lens substrate 620. In the example shown in FIG. 10, the lens substrate 620 is divided into a plurality of lens members 621 in the row direction. The lens substrate 620 can be divided into the plurality of lens members 621 in the row direction so that, for example, the two-dimensionally arrayed lenses are divided in each row. Since 72 lenses which correspond to the number of channels of optical communication, for example, are formed in the lens substrate 620 in the example shown in FIG. 10, the lens substrate 620 is divided into 6 lens members 621. Note that a direction in which the lens substrate 620 is divided into the plurality of lens members 621 is not limited thereto, and the lens substrate 620 may be divided in, for example, the column direction. The direction and number in which the lens substrate 620 is divided may be appropriately designed according to a method of arraying the lenses on the lens substrate 620.

In addition, boss parts (not illustrated) which are protruding portions are provided in the vicinity of both ends of each lens member 621 in its array direction. A total of 12 boss parts are provided at both ends of each lens member 621 in the example shown in FIG. 10. The boss parts correspond to the boss parts 122 of the configuration shown in FIG. 3, and when the boss parts are fitted into fitting parts 613 of the ferrule 610 to be described later, the ferrule 610 and the lens substrate 620 are connected to each other in the state in which, for example, their facing surfaces come in contact with each other.

The ferrule 610 is constituted by a single member in the present modified example. The ferrule 610 is provided with 72 through holes 612 corresponding to the number of lenses, for example, in positions facing the lenses of the lens substrate 620 when the ferrule 610 and the lens substrate 620 are connected to each other. The through holes 612 correspond to the through holes 112 of the configuration shown in FIG. 3. When optical fibers are inserted into each of the through holes 612 from the negative direction of the z axis of the drawing, the ends of the optical fibers are disposed to face each of the lenses of the lens substrate 620.

The fitting parts 613 into which one end of each boss part of the lens members 621 described above is fitted are formed in regions corresponding to both ends of each row of the through holes 612 provided two-dimensionally within the facing surface of the ferrule 610. The fitting parts 613 correspond to the fitting parts 113 of the configuration shown in FIG. 3. When the boss parts provided in each lens members 621 are fitted into the fitting parts 613 of the ferrule 610, the ferrule 610 and the lens substrate 620 are connected to each other in the state in which both ends of each lens member 621 are fixed.

As described above, the optical communication device 60 according to the modified example corresponds to a configuration in which the ferrule 110 is constituted by a single member and the lens substrate 120 is divided into a plurality of lens members in the configuration of the optical communication device 10 shown in FIG. 3. Even when the lens substrate 620, rather than the ferrule 610, is divided as in the present modified example, the same effect as exhibited in the present embodiment described in <2. Comparison to a general connector> described above can be obtained. In addition, in [3-1. Modified example in which supporting members for suppressing deformation of ferrule members are added] and [3-2. Modified example in which parts of the ferrule members are connected to each other] described above, the modified examples in which the ferrule is divided into the plurality of ferrule members have been described, however, the same configuration as the modified examples can also be applied to the plurality of lens members 621 described above.

3-4. Modified Example in which a Lens Substrate is Composed of a Plurality of Materials In the optical communication device 10 according to the present embodiment described above, the lens substrate 120 is formed of a single material selected from resin-based materials, for example, polycarbonate, a PEI-based material, a nylon or PBT-based material, polyolefin, a COC, and the like. The present embodiment, however, is not limited thereto, and the lens substrate 120 may be composed of a plurality of different materials.

Figure 11:
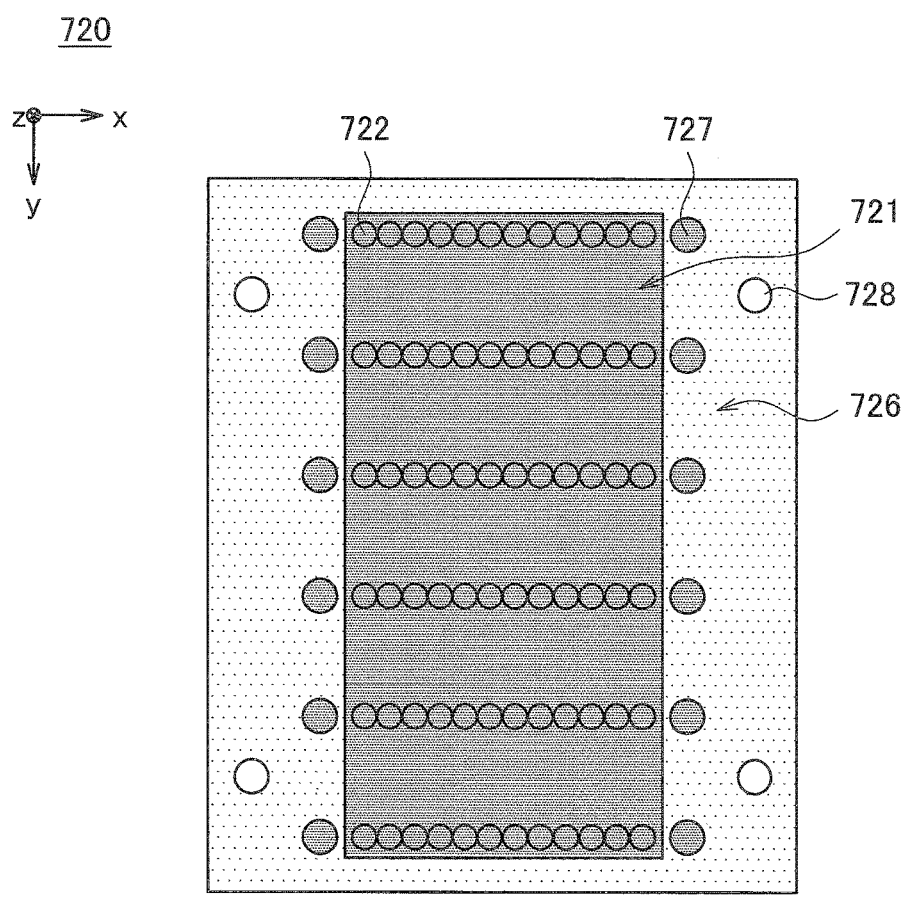
FIG. 11 is a schematic diagram showing a configuration of a lens substrate according to a modified example in which the lens substrate is composed of a plurality of different materials.
Figure 12:
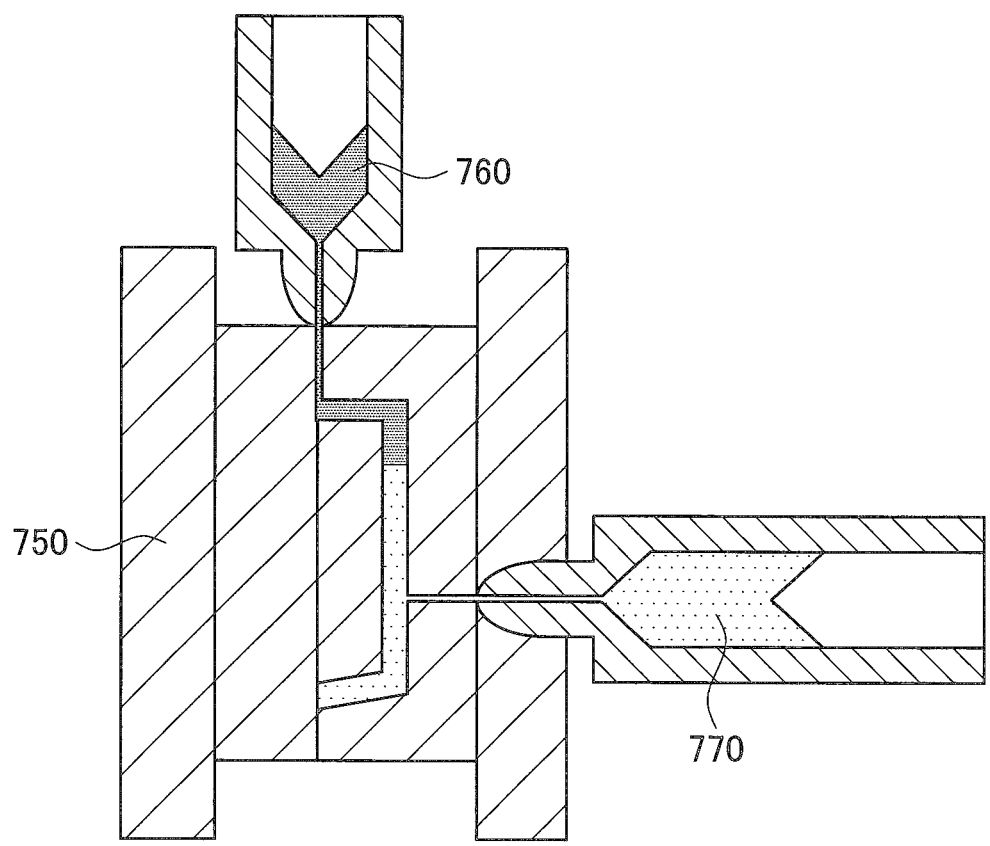
FIG. 12 is an illustrative diagram for describing an example of a method for producing the lens substrate according to the modified example shown in FIG. 11.

A modified example in which a lens substrate is composed of a plurality of different materials will be described with reference to FIGS. 11 and 12. FIG. 11 is a schematic diagram showing a configuration of the lens substrate according to the modified example in which the lens substrate is composed of a plurality of different materials. Note that FIG. 11 corresponds to FIG. 4A described above, illustrating a state in which the lens substrate according to the modified example is viewed from the direction in which optical fibers are inserted, in other words, the negative direction of the z axis. In addition, FIG. 12 is an illustrative diagram for describing an example of a method for producing the lens substrate according to the present modified example shown in FIG. 11.

Referring to FIG. 11, the lens substrate 720 according to the present modified example has a lens array unit 721 and an outer frame unit 726 which are formed of different materials. The lens array unit 721 has a plurality of lenses 722 formed two-dimensionally thereon. The lenses 722 correspond to the lenses 121 of the configuration shown in FIG. 4A, and are formed to be corresponding in number to the channels of optical communication.

The outer frame unit 726 is provided around the lens array unit 721. In the outer frame unit 726, boss parts 727 which fit into fitting parts provided in a ferrule (not illustrated) when the lens substrate 720 is connected to the ferrule and connection holes 728 for connecting the lens substrate 120 to the optical communication module 20 shown in FIG. 1 are formed. The boss parts 727 correspond to the boss parts 122 of the configuration shown in FIG. 4A. In addition, the connection holes 728 are openings for connection to the optical communication module 20 into which the tips of the positioning pins 240 of the optical communication module 20 of the configuration shown in FIG. 1 are fitted. Note that, although not illustrated in the drawings other than FIG. 1 described above, the lens substrates 120 and 620 according to the embodiment and the modified examples described above may likewise be provide with such openings for connection to the optical communication module 20.

In the present modified example, the lens array unit 721 and the boss parts 727 are formed of a first material, and portions of the outer frame unit 726 except for the boss parts 727 are formed of a second material different from the first material. The first material is selected based on optical properties required for, for example, the lenses 722. Specifically, the first material can be selected such that the optical properties of the material, including the transmittance, the refractive index, and the like, have predetermined values in consideration of properties of light (for example, a wavelength, and the like) that passes through the lenses 722. On the other hand, for the second material, for example, a material with excellent resistance to abrasion can be selected when a possibility of repeated attachment and detachment of the unit to and from the optical communication module 20 is considered.

The lens substrate 720 is formed using, for example, an injection molding method. In the injection molding method, a material which has been heated and thereby softened is injected into a mold having the shape of the lens substrate 720 by putting predetermined pressure thereon, the mold is accordingly filled with the material, and thereby the lens substrate 720 according to the shape of the mold is produced. In the present modified example, since the lens substrate 720 is composed of two different kinds of materials, among injection molding methods, a two-color molding method that uses two kinds of materials is used.

FIG. 12 conceptually illustrates the two-color molding method among the injection molding methods. Referring to FIG. 12, a first material 760 is injected from a first opening and a second material 770 is injected from a second opening into a mold 750 in the two-color molding method. The mold 750 is produced based on, for example, a shape of the lens substrate 720. By injecting different materials from different openings into the mold 750 under predetermined pressure as above, the lens substrate 720 can be formed of different kinds of materials.

Hereinabove, the modified example in which the lens substrate 720 is composed of the plurality of materials has been described with reference to FIGS. 11 and 12. Since the lens substrate 720 is formed of different materials as described above, materials which meet characteristics of the lens array unit 721 from which predetermined optical properties for forming the lenses 722 are required and the outer frame unit 726 from which predetermined resistance to abrasion for frequent occurrences of physical contact is required can be selected. Thereby, the lens substrate 720 with excellent properties in both optical properties and resistance to abrasion is realized. In addition, since the lenses 722 and the boss parts 727 are integrally molded using the same materials in the present modified example, it is possible to enhance accuracy in aligning the formation positions of the boss parts 727 and the formation positions of the lenses 722 as in the embodiment described above.

Note that, although the case in which the lens substrate 720 is formed of two different kinds of materials has been described above, the present modified example is not limited thereto. The lens substrate 720 may be formed of more than two kinds of materials. For example, the lens substrate 720 can be produced through injection molding methods that use more kinds of materials including a three-color molding method. As above, the lens substrate 720 may be formed through multi-color molding that uses at least two different resin-based materials. Note that any of various kinds of known processing devices, processing conditions, and the like may be applied to a specific processing device configuration, processing condition, and the like of the injection molding method used when the lens substrate 720 is produced in the present modified example. The specific condition of the injection molding method used when the lens substrate 720 is produced may be appropriately set based on, for example, a kind of material used, and the like.

3-5. Modified Example in which a Ferrule and a Lens Substrate are Formed of the Same Material In the optical communication device 10 according to the present embodiment described above, the ferrule 110 is formed of a resin-based material, for example, PPS, LCP, epoxy, or the like. In addition, the lens substrate 120 is formed of any of resin-based materials such as polycarbonate, a PEI-based material, a nylon or PBT-based material, polyolefin, a COC, and the like or any of various kinds of glass-based materials. The ferrule 110 and the lens substrate 120 are formed of different materials from each other in the embodiment described above. The present embodiment is not limited thereto, and the ferrule 110 and the lens substrate 120 may be composed of the same material.

In the general MT ferrule 80 with a lens array shown in FIG. 5, for example, both of the ferrule 810 and the lens substrate 820 are formed of the resin-based materials. The material is selected for the ferrule 810 in consideration of processability of the shape of the through holes 812 into which the optical fibers are inserted with high accuracy and workability of the material at the time of grinding the end faces of the through holes 812 after the optical fibers are inserted thereinto. On the other hand, as a material of the lens substrate 820, a material which enables the lenses to have a predetermined optical property and the shape of the lenses to be processed with high accuracy is required. Since the materials of the ferrule 810 and the lens substrate 820 are each required to have different properties as above, it is difficult to produce the ferrule 810 and the lens substrate 820 using the same resin-based material. Thus, the ferrule 810 and the lens substrate 820 should be formed of materials having different linear expansion coefficients in the general known technology and an amount of positional deviation between the center axes of the through holes 812 and the optical axes of the lenses of the lens substrate 820 when a temperature change occurs is large.

In the present modified example, by forming both of the ferrule 110 and the lens substrate 120 using glass-based materials in the configuration of the optical communication device 10 shown in FIG. 3, for example, the ferrule 110 and the lens substrate 120 can be formed of the materials having similar linear expansion coefficients. Glass-based materials are known to have linear expansion coefficients from about 3 to 4 ppm. Using the glass-based materials, the ferrule 110 and the lens substrate 120 can be formed of materials having similar linear expansion coefficients, and accordingly, an amount of positional deviation between the center axes of the through holes 112 and the optical axes of the lenses 121 caused by a temperature change can be reduced.

Specifically, a photosensitive glass material is used as a material of the ferrule 110 in the present modified example. As the photosensitive glass material undergoes processes such as exposure to ultraviolet rays using a photomask, modification of the exposed portion caused by heat treatment, and etching of the modified portion, vias can be processed with high accuracy. Thus, by using the photosensitive glass material, the through holes 112 of the ferrule 110 can be formed with high accuracy.

Figure 13:
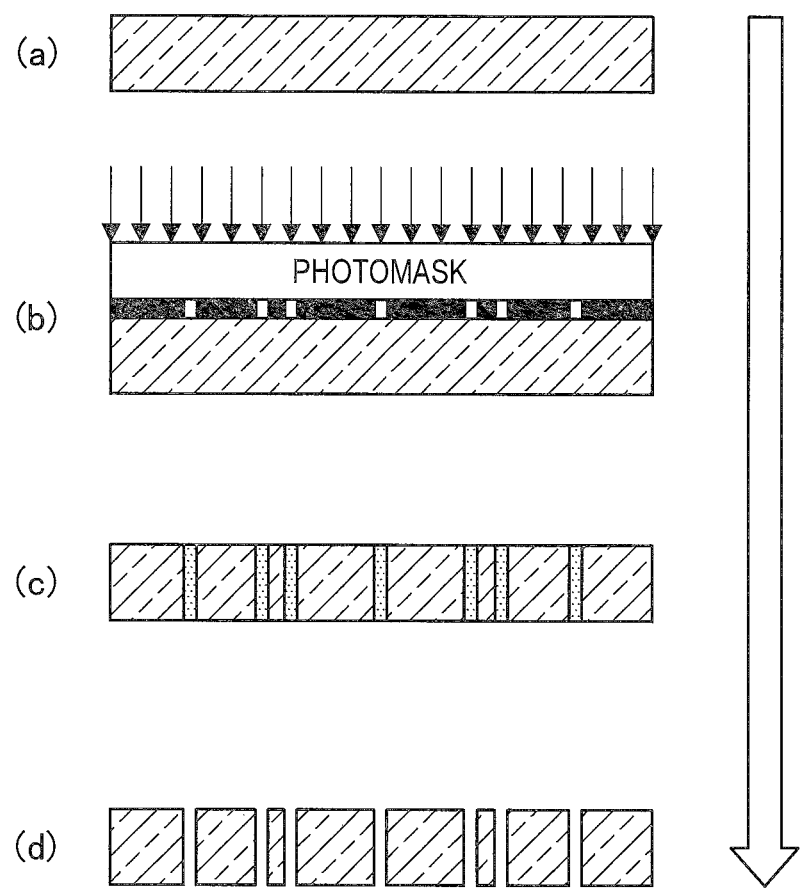
FIG. 13 is an illustrative diagram for describing an example of processing of a photosensitive glass material using vias.

With reference to FIG. 13, an example of processing of vias using a photosensitive glass material will be described. FIG. 13 is an illustrative diagram for describing an example of processing of a photosensitive glass material using the vias.

Referring to FIG. 13, first in the process, a thickness of a glass substrate formed of a photosensitive glass material is processed to be, for example, about 1 mm (step (a)). Then, the glass substrate is exposed to ultraviolet rays with a photomask of which positions corresponding to formation positions of the vias are opened placed thereon (step (b)). A Xe—Hg lamp with an output of 1 kW, for example, is used as a light source of ultraviolet rays, and the ultraviolet rays having a wavelength of 320 nm are radiated thereto in an exposure amount of 2000 mJ/cm$^2$.

Then, after the photomask is removed, heat treatment is performed on the glass substrate (step (c)). In the heat treatment, heating is performed at a temperature of, for example, 450 degrees to 600 degrees (for example, 590 degrees) for one hour. The heat treatment modifies the site exposed in step (b) (in other words, the formation positions of the vias).

Next, an etching process is performed on the glass substrate after the heat treatment, the sites modified in step (c) are removed, and thereby the vias are formed (step (d)). For the etching process, wet etching using dilute hydrofluoric acid is performed.

Through steps (a) to (d) described above, the through holes 112 of the ferrule 110 can be processed with high accuracy. Note that the glass-based material used for the ferrule 110 in the present modified example may include, in units of weight %, $SiO_2$ at 55% to 85%, $Al_2O_3$ at 2% to 20%, $Li_2O$ at 5% to 15%, and $SiO_2+Al_2O_3+Li_2O>85\%$ as basic components, and Au at 0.001% to 0.05%, Ag at 0.001% to 0.5%, and $Cu_2O$ at 0.001% to 1% as photosensitive metal components.

When the through holes 112 are formed using the photosensitive glass material in steps (a) to (d) described above, processing accuracy of the through holes 112 can be realized as high accuracy of about 0.2 μm. In addition, the linear expansion coefficient of the glass-based material is about 3 to 4 ppm. Thus, a position change of the through holes 112 of the ferrule 110 caused by a temperature change can be drastically reduced. In addition, as a material of the lens substrate 120, a glass-based material that has a linear expansion coefficient similar to the linear expansion coefficient of the photosensitive glass material used in the ferrule 110 can be appropriately selected in consideration of ease in processing the lenses 121, optical properties thereof, and the like. By forming both of the ferrule 110 and the lens substrate 120 using glass-based materials in the present modified example, the ferrule 110 and the lens substrate 120 can be formed of materials having similar linear expansion coefficients, and the amount of positional deviation between the center axes of the through holes 112 and the optical axes of the lenses 121 caused by a temperature change can be reduced.

Note that, although a heat shrinkage gap generally occurring in heat treatment is a concern with respect to photosensitive glass materials, the inventors have found through research that the heat shrinkage gap falls within the range of about ±133 ppm in the process shown in FIG. 13. Considering the heat shrinkage gap, when the through holes 112 are formed at an interval of 2.3 mm in the y-axis direction in the configuration shown in FIG. 3, the amount of positional deviation is about 0.7 μm. Thus, even when the ferrule 110 is formed using a photosensitive glass material, influence of heat shrinkage occurring in the process on the amount of positional deviation of the through holes 112 is sufficiently little.

Hereinabove, the modified example in which the ferrule and the lens substrate are formed of the same material has been described. Note that, although the case in which the ferrule 110 is formed of a photosensitive glass material has been described above, the present modified example is not limited thereto. As long as a glass-based material which enables the vias to be processed with high accuracy is used as the material of the ferrule 110, other glass-based materials may be used. In addition, when another glass-based material is used as the material of the ferrule 110, any of various methods other than etching described above may be used as a processing method for the through holes 112. For example, the through holes 112 can be formed using any of various kinds of processing methods including laser radiation, sandblasting, mechanical drilling, and the like.

4. Application Examples

Figure 14:
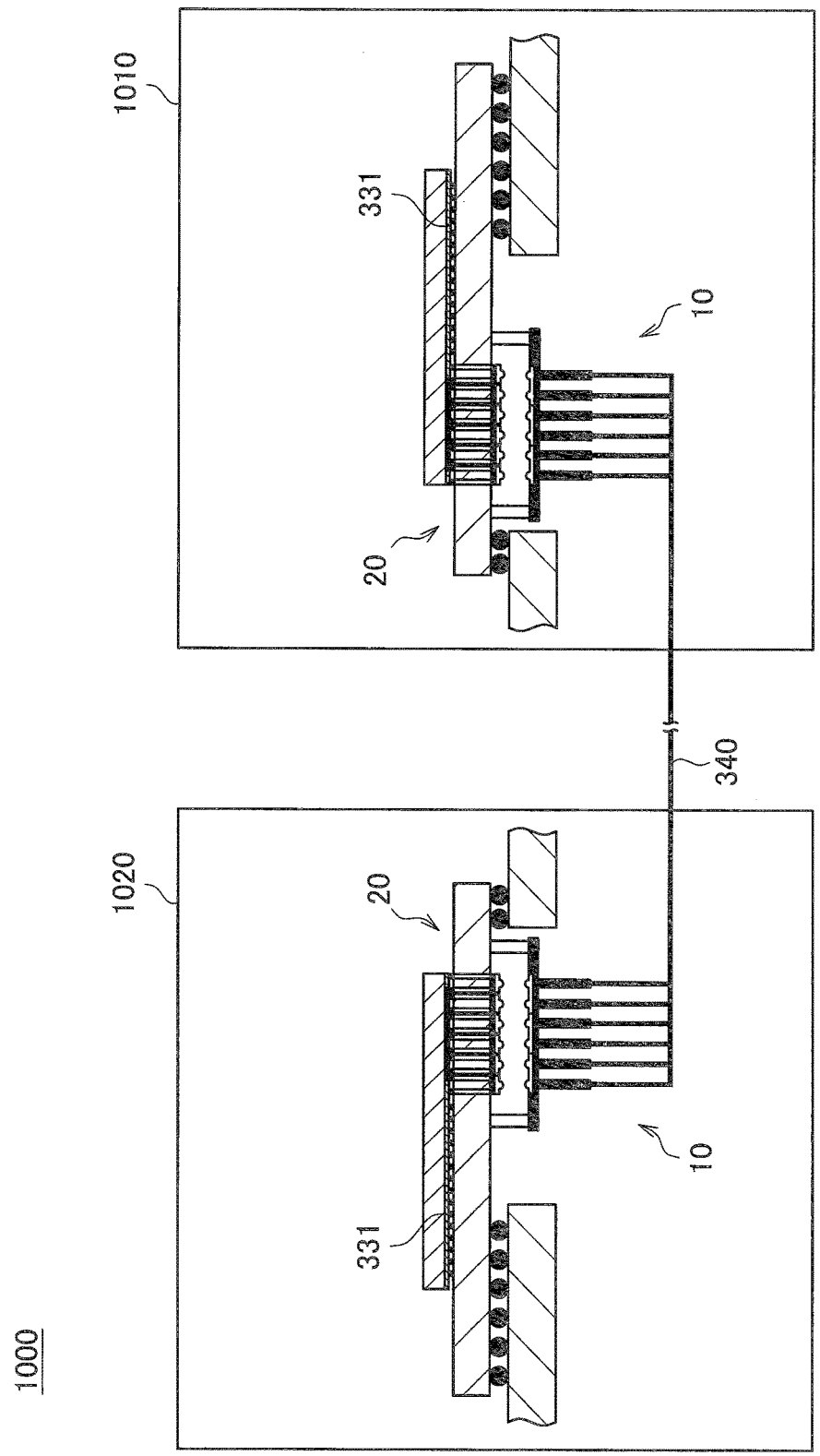
FIG. 14 is a schematic diagram showing a configuration example in which the optical communication device according to the embodiment is applied to optical communication between information processing apparatuses.

4-1. Optical Communication Between Optical Communication Modules and Between Apparatuses The optical communication device 10 according to the present embodiment can be applied to, for example, optical communication between the optical communication modules 20 shown in FIG. 1. In addition, it can be preferably applied to optical communication between apparatuses in which the optical communication module 20 is mounted, for example, information processing apparatuses such as PCs, work stations (WSs), and servers. A configuration example in which the optical communication device 10 according to the present embodiment is applied to, for example, optical communication between information processing apparatuses in which the optical communication module 20 shown in FIG. 1 is mounted will be described with reference to FIG. 14. FIG. 14 is a schematic diagram showing the configuration example in which the optical communication device 10 according to the present embodiment is applied to optical communication between information processing apparatuses.

FIG. 14 illustrates the case in which the optical communication device 10 according to the present embodiment shown in FIG. 1 is applied to optical communication between the information processing apparatuses as one of the present application examples. Referring to FIG. 14, a transmission and reception system 1000 in which various kinds of data are transferred through optical communication has a transmission apparatus 1010 and a reception apparatus 1020. The transmission apparatus 1010 and the reception apparatus 1020 are each examples of the information processing apparatuses, and can be information processing apparatuses, for example, PCs, WSs, servers, and the like.

Each of the transmission apparatus 1010 and the reception apparatus 1020 has the optical communication module 20 with, for example, the configuration shown in FIG. 1. The transmission apparatus 1010 includes the transmission-side optical communication module 20 and the reception apparatus 1020 includes the reception-side optical communication module 20. When the optical communication modules 20 are connected to each other by the optical communication device 10 according to the present embodiment, the transmission apparatus 1010 and the reception apparatus 1020 can transfer various kinds of data in optical communication through the optical communication device 10. Here, the processor 331 is, for example, a CPU mounted in the transmission apparatus 1010 and the reception apparatus 1020, and controls overall operations of the transmission apparatus 1010 and the reception apparatus 1020 by operating according to a predetermined program. In reality, data can be transferred between the processor 331 mounted in the transmission apparatus 1010 and the processor 331 mounted in the reception apparatus 1020 through the optical communication modules 20.

Note that, in FIG. 14, configurations of the transmission apparatus 1010 and the reception apparatus 1020 other than the configuration shown in FIG. 1 are not illustrated. Among the configurations that are not illustrated, the transmission apparatus 1010 and the reception apparatus 1020 may include any of various configurations that generally known information processing apparatuses have. Since the configurations that are not illustrated may be any known configurations used in general information processing apparatuses, detailed description thereof will be omitted.

In the example shown in FIG. 14, the transmission apparatus 1010 and the reception apparatus 1020 are connected to each other by an optical fiber 340 via the optical communication device 10 according to the present embodiment. Specifically, connection between the optical communication modules 20 of the transmission apparatus 1010 and the reception apparatus 1020 and the optical fiber 340 is made by the optical communication device 10. The optical fiber 340 may cause the transmission apparatus 1010 and the reception apparatus 1020 to be connected to each other via a communication network (network) that is not illustrated.

Information that has undergone various processes by the processor 331 provided in the transmission apparatus 1010 is converted from electrical signals into light through photoelectric conversion, and the light on which the converted predetermined information is superimposed is transmitted from the optical communication module 20 to the reception apparatus 1020 through the optical fiber 340. In the reception apparatus 1020, the optical communication module 20 receives the light that has propagated through the optical fiber 340, and then electric signals which are obtained by converting the light through photoelectric conversion and accordingly have the predetermined information superimposed thereon are input to the processor 331 provided in the reception apparatus 1020. Thereby, optical communication between the transmission apparatus 1010 and the reception apparatus 1020 through the optical communication device according to the present embodiment is realized.

In addition, in the example shown in FIG. 14, although the case in which the transmission-side optical communication module 20 of the transmission apparatus 1010 and the reception-side optical communication module 20 of the reception apparatus 1020 are connected by the optical communication devices 10 and the optical fiber 340 and data is transferred from the transmission apparatus 1010 to the reception apparatus 1020 has been described, the present application example is not limited thereto. The transmission and reception system 1000 may be configured such that the transmission apparatus 1010 further includes the reception-side optical communication module 20, the reception apparatus 1020 further includes the transmission-side optical communication module 20, and the optical communication modules 20 are connected to each other as well by the optical fiber 340, and thereby the transmission apparatus 1010 and the reception apparatus 1020 can transmit and receive various kinds of information to and from each other in optical communication.

In addition, although data transfer performed between two information processing apparatuses which are the transmission apparatus 1010 and the reception apparatus 1020 has been described above, the present application example is not limited thereto. The transmission and reception system 1000 may be configured such that more than two information processing apparatuses are connected to each other via the optical communication devices 10 and the optical fiber 340, and thereby various kinds of information can be transmitted and received thereamong in optical communication.

In addition, although the case in which the optical communication device 10 exemplified in FIG. 3 is applied to optical communication between the information processing apparatuses has been described above as one of the present application examples, the present application examples are not limited thereto. Any optical communication device according to various modified examples of the present embodiment described above can also be applied to optical communication between information processing apparatuses in the same manner.

4-2. Connection Between Optical Fibers

Figure 15:
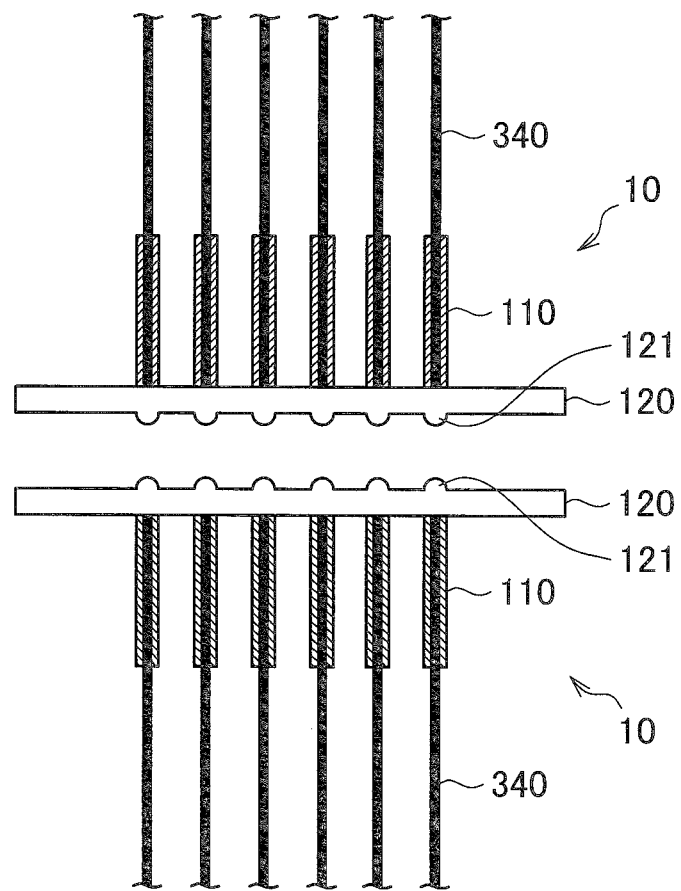
FIG. 15 is a schematic diagram showing a configuration example when the optical communication device according to the embodiment is applied to connection between optical fibers.

The optical communication device 10 according to the present embodiment can be preferably applied to connection between optical fibers. A configuration example in which the optical communication device 10 according to the present embodiment is applied to connection between optical fibers will be described with reference to FIG. 15. FIG. 15 is a schematic diagram showing the configuration example when the optical communication device 10 according to the present embodiment is applied to connection between optical fibers FIG. 15 illustrates the case in which the optical communication device 10 according to the present embodiment shown in FIG. 1 is applied to optical communication between optical fibers as one of the present application examples. Referring to FIG. 15, a pair of the optical communication devices 10 according to the present embodiment are each disposed so as to face a surface of the other on which the lenses 121 of the lens substrates 120 are formed.

The lens substrates 120 of the pair of the optical communication device 10 may be fixedly connected to each other via, for example, pins (not illustrated) so that the optical axes of the facing lenses 121 substantially coincide with each other. Light that has propagated through one optical fiber 340 is diffused after passing through the lenses 121 of the optical communication device 10 of one side, and then is incident on the lenses 121 of the optical communication device 10 of the other side. In the optical communication device 10 on which light is incident, the light is collected at the end of the optical fiber by the lenses 121, thereby being incident on the optical fiber.

Hereinabove, the configuration example in which the optical communication device 10 according to the present embodiment is applied to connection between optical fibers has been described with reference to FIG. 15. Note that, although the case in which the optical communication device 10 exemplified in FIG. 3 is applied to connection between optical fibers has been described as one of the present application examples, the present application examples are not limited thereto. Any optical communication device according to various modified examples of the present embodiment described above can also be applied to connection between optical fibers in the same manner.

5. Supplement

Although exemplary embodiments of the present disclosure have been described in detail above with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof. In addition, the effects described in the present specification are merely illustrative and demonstrative, and not limitative. In other words, the technology according to the present disclosure can exhibit other effects that are evident to those skilled in the art based on the present specification along with or instead of the effects.

The configurations according to the embodiment and modified examples described above, for example, may each be realized individually, or may be combined with each other to the extent possible. When the configurations described above are combined, an effect in which the effects exhibited in each of the configurations are combined can be obtained.

(1) An optical communication device including:
a lens substrate configured to have a first face on which a plurality of lenses corresponding to a plurality of channels of optical communication are two-dimensionally formed; and
a ferrule configured to be disposed facing a second face that is the opposite face of the first face of the lens substrate and to be provided with through holes into which optical fibers are inserted in positions corresponding to each of the plurality of lenses,
wherein a region of the lens substrate or the ferrule having a predetermined length at least in the direction perpendicular to a facing surface is divided into a plurality of regions in a row direction or a column direction within a plane that is parallel to the facing surface, and
wherein, when both ends of each of the plurality of regions are fixed to the facing surface by a pin, the lens substrate and the ferrule are connected to each other.
(2) The optical communication device according to (1), wherein the ferrule is divided into a plurality of ferrule members in the row direction or the column direction within the plane that is parallel to the facing surface.
(3) The optical communication device according to (2),
wherein the facing surface of the lens substrate has boss parts formed thereon which are fitted to both ends of each of the ferrule members, thereby causing the ferrule members and the lens substrate to be connected to each other, and
wherein the boss parts are integrally molded with the lenses.
(4) The optical communication device according to (2) or (3), wherein the plurality of ferrule members are connected to the lens substrate such that the ferrule members do not come in contact with each other.
(5) The optical communication device according to (4), wherein the ferrule members are connected to the lens substrate such that an inclination of the ferrule members in an array direction with respect to the direction perpendicular to the facing surface of the ferrule members is equal to or smaller than an angle defined by the tangent between a length in the direction perpendicular to the facing surface of the ferrule members and the distance between the ferrule members.
(6) The optical communication device according to any one of (2) to (5), further including:
a stick-like supporting member configured to be provided on the face on the opposite side of the facing surface of the ferrule and to lie over the plurality of ferrule members.
(7) The optical communication device according to any one of (2) to (6), further including:
a supporting member provided between the plurality of ferrule members.
(8) The optical communication device according to (1),
wherein the ferrule has partial regions that are connected to each other within a plane parallel to the facing surface, and
wherein only a region having a predetermined length in the direction perpendicular to the facing surface is divided into a plurality of regions in the row direction or the column direction within the plane parallel to the facing surface.
(9) The optical communication device according to (1), wherein the lens substrate is divided into a plurality of lens members in the row direction or the column direction within the plane parallel to the facing surface
(10) The optical communication device according to any one of (1) to (9),
wherein 12 lenses and through holes are formed to be lined in one row or one column, and
wherein the lens substrate or the ferrule is divided so that each divided region includes a row or a column in which the 12 lenses or through holes are lined.
(11) The optical communication device according to any one of (1) to (10), wherein the lens substrate is formed through multi-color molding using at least two different resin-based materials.
(12) The optical communication device according to any one of (1) to (11), wherein a region of the lens substrate in which the lenses are formed and a region of the lens substrate other than the region in which the lenses are formed in contact with the ferrule are formed of different materials.
(13) The optical communication device according to any one of (1) to (12), wherein the ferrule is formed of a resin-based material.
(14) The optical communication device according to any one of (1) to (10), wherein the lens substrate and the ferrule are formed of a glass-based material.

(15) The optical communication device according to (14), wherein the ferrule is formed of a photosensitive glass material.

(16) The optical communication device according to (14), wherein the through holes of the ferrule are formed using one of processing methods including etching, sandblasting, and laser radiation.

(17) The optical communication device according to any one of (1) to (16), which is configured to be connected to a module which performs input and output for optical communication such that the plurality of lenses which are formed on the lens substrate face other lenses which are provided on a light input and output face of the module.

(18) A transmission apparatus including:

an optical communication device configured to include a lens substrate that has a first face on which a plurality of lenses corresponding to a plurality of channels of optical communication are two-dimensionally formed and a ferrule configured to be disposed facing a second face that is the opposite face of the first face of the lens substrate and to be provided with through holes into which optical fibers are inserted in positions corresponding to each of the plurality of lenses, wherein, in the optical communication device, a region of the lens substrate or the ferrule having a predetermined length at least in the direction perpendicular to a facing surface is divided into a plurality of regions in a row direction or a column direction within a plane that is parallel to the facing surface, and when at least both end portions of each of the plurality of regions are fixed to the facing surface by a pin, the lens substrate and the ferrule are connected to each other, and wherein light on which predetermined information is superimposed is transmitted to an arbitrary apparatus via the optical communication device.

(19) A reception apparatus including:

an optical communication device configured to include a lens substrate that has a first face on which a plurality of lenses corresponding to a plurality of channels of optical communication are two-dimensionally formed and a ferrule configured to be disposed facing a second face that is the opposite face of the first face of the lens substrate and to be provided with through holes into which optical fibers are inserted in positions corresponding to each of the plurality of lenses, wherein, in the optical communication device, a region of the lens substrate or the ferrule having a predetermined length at least in the direction perpendicular to a facing surface is divided into a plurality of regions in a row direction or a column direction within a plane that is parallel to the facing surface, and when at least both end portions of each of the plurality of regions are fixed to the facing surface by a pin, the lens substrate and the ferrule are connected to each other, and wherein light on which predetermined information is superimposed is received from an arbitrary apparatus via the optical communication device.

(20) A transmission and reception system including:

a transmission apparatus configured to include an optical communication device which has a lens substrate that has a first face on which a plurality of lenses corresponding to a plurality of channels of optical communication are two-dimensionally formed and a ferrule that is disposed facing a second face that is the opposite face of the first face of the lens substrate and to be provided with through holes into which optical fibers are inserted in positions corresponding to each of the plurality of lenses, and configured to transmit light on which predetermined information is superimposed to an arbitrary apparatus via the optical communication device; and a reception apparatus configured to include such an optical communication device and to receive the light transmitted from the transmission apparatus via the optical communication device, wherein, in the optical communication device, a region of the lens substrate or the ferrule having a predetermined length at least in the direction perpendicular to a facing surface is divided into a plurality of regions in a row direction or a column direction within a plane that is parallel to the facing surface, and when at least both end portions of each of the plurality of regions are fixed to the facing surface by a pin, the lens substrate and the ferrule are connected to each other.

What is claimed is:

1. An optical communication device comprising:
a lens substrate configured to have a first face and a second face, wherein the first face includes a plurality of lenses corresponding to a plurality of channels of optical communication, the plurality of lenses is two-dimensionally formed to face a second lens substrate;
a ferrule configured to be disposed facing the second face of the lens substrate that is opposite from the first face, the ferrule including through-holes that are configured to receive optical fibers in positions corresponding to the plurality of lenses,
wherein a region of the lens substrate and a region of the ferrule, each having a predetermined length at least in a direction perpendicular to a facing surface and is divided into a plurality of regions in a row direction or a column direction within a plane that is parallel to the facing surface; and
a pin configured to connect the lens substrate and the ferrule to each other.

2. The optical communication device according to claim 1, wherein the ferrule is divided into a plurality of ferrule members in the row direction or the column direction within the plane that is parallel to the facing surface.

3. The optical communication device according to claim 2,
wherein the facing surface of the lens substrate has boss parts formed thereon which are fitted to both ends of each of the plurality of ferrule members, thereby causing the plurality of ferrule members and the lens substrate to be connected to each other, and
wherein the boss parts are integrally molded with the plurality of lenses.

4. The optical communication device according to claim 2, wherein the plurality of ferrule members is connected to the lens substrate, and wherein the plurality of ferrule members do not come in contact with each other.

5. The optical communication device according to claim 4, wherein the plurality of ferrule members is connected to the lens substrate such that an inclination of the plurality of ferrule members in an array direction with respect to the direction perpendicular to the facing surface of the ferrule members is equal to or smaller than an angle defined by a tangent between a length in the direction perpendicular to the facing surface of the ferrule members and a distance between the plurality of ferrule members.

6. The optical communication device according to claim 4, further comprising:

a stick-like supporting member configured to be provided on the face on the opposite side of the facing surface of the ferrule and to lie over the plurality of ferrule members.

7. The optical communication device according to claim 4, further comprising:
a supporting member provided between the plurality of ferrule members.

8. The optical communication device according to claim 1,
wherein the ferrule has partial regions that are connected to each other within the plane that is parallel to the facing surface, and
wherein the region of the ferrule having the predetermined length in the direction perpendicular to the facing surface is divided into a plurality of regions in the row direction or the column direction within the plane parallel to the facing surface.

9. The optical communication device according to claim 1, wherein the lens substrate is divided into a plurality of lens members in the row direction or the column direction within the plane parallel to the facing surface.

10. The optical communication device according to claim 1,
wherein the plurality of lenses comprises twelve lenses,
wherein the through-holes are twelve through-holes,
wherein the twelve lenses and the twelve through-holes are formed to be lined in one row or one column, and
wherein the lens substrate or the ferrule is divided so that each divided region includes a row or a column in which the twelve lenses or the twelve through-holes are lined.

11. The optical communication device according to claim 1, wherein the lens substrate is formed through multi-color molding using at least two different resin-based materials.

12. The optical communication device according to claim 11, wherein the lens substrate includes a lens region and a second region separate from the lens region that is in contact with the ferrule, wherein the lens region and the second region are formed of different materials.

13. The optical communication device according to claim 1, wherein the ferrule is formed of a resin-based material.

14. The optical communication device according to claim 1, wherein the lens substrate and the ferrule are formed of a glass-based material.

15. The optical communication device according to claim 14, wherein the ferrule is formed of a photosensitive glass material.

16. The optical communication device according to claim 14, wherein the through-holes of the ferrule are formed by at least one of etching, sandblasting, or laser radiation.

17. The optical communication device according to claim 1, wherein the lens substrate is configured to be in communication with a module that performs input and output for optical communication, and wherein the plurality of lenses face other lenses that are provided on the second lens substrate of a light input and output face of the module.

18. A transmission apparatus comprising:
an optical communication device including
a lens substrate that has a first face and a second face, wherein the first face includes a plurality of lenses corresponding to a plurality of channels of optical communication, the plurality of lenses being two-dimensionally formed to face a second lens substrate, and
a ferrule configured to be disposed facing the second face that is opposite from the first face, the ferrule including through-holes that are configured to receive optical fibers in positions corresponding to the plurality of lenses,
wherein a region of the lens substrate and a region of the ferrule, each having a predetermined length at least in a direction perpendicular to a facing surface and is divided into a plurality of regions in a row direction or a column direction within a plane that is parallel to the facing surface, and
a pin configured to connect the lens substrate and the ferrule to each other,
wherein the optical communication device is configured to transmit light that includes predetermined information to a reception apparatus.

19. A reception apparatus comprising:
an optical communication device including
a lens substrate that has a first face and a second face, wherein the first face includes a plurality of lenses corresponding to a plurality of channels of optical communication, the plurality of lenses being two-dimensionally formed to face a second lens substrate, and
a ferrule configured to be disposed facing the second face that is opposite from the first face, the ferrule including through-holes that are configured to receive optical fibers in positions corresponding to the plurality of lenses,
wherein a region of the lens substrate and a region of the ferrule, each having a predetermined length at least in a direction perpendicular to a facing surface and is divided into a plurality of regions in a row direction or a column direction within a plane that is parallel to the facing surface, and
a pin configured to connect the lens substrate and the ferrule to each other,
wherein the optical communication device is configured to receive light that includes predetermined information from a transmission apparatus.

20. An optical communication system comprising:
a transmission apparatus having a first optical communication device that includes
a lens substrate that has a first face and a second face, wherein the first face includes a plurality of lenses corresponding to a plurality of channels of optical communication, the plurality of lenses being two-dimensionally formed to face a second lens substrate, and
a ferrule configured to be disposed facing the second face that is opposite from the first face, the ferrule including through-holes that are configured to receive optical fibers in positions corresponding to the plurality of lenses,
wherein a region of the lens substrate and a region of the ferrule, each having a predetermined length at least in a direction perpendicular to a facing surface and is divided into a plurality of regions in a row direction or a column direction within a plane that is parallel to the facing surface, and
a pin configured to connect the lens substrate and the ferrule to each other; and
a reception apparatus having a second optical communication device including the second lens substrate,
wherein the reception apparatus is configured to receive light that includes predetermined information from the transmission apparatus, and wherein the transmission apparatus is configured to transmit the light that includes the predetermined information to the reception apparatus.

21. An optical communication system comprising:
a reception apparatus having a first optical communication device that includes
   a lens substrate that has a first face and a second face, wherein the first face includes a plurality of lenses corresponding to a plurality of channels of optical communication, the plurality of lenses being two-dimensionally formed to face a second lens substrate, and
   a ferrule configured to be disposed facing the second face that is opposite from the first face, the ferrule including through-holes that are configured to receive optical fibers in positions corresponding to the plurality of lenses,
   wherein a region of the lens substrate and a region of the ferrule, each having a predetermined length at least in a direction perpendicular to a facing surface and is divided into a plurality of regions in a row direction or a column direction within a plane that is parallel to the facing surface, and
   a pin configured to connect the lens substrate and the ferrule to each other; and
a transmission apparatus having a second optical communication device including the second lens substrate,
wherein the reception apparatus is configured to receive light that includes predetermined information from the transmission apparatus, and
wherein the transmission apparatus is configured to transmit the light that includes the predetermined information to the reception apparatus.

* * * * *